United States Patent
Hogan et al.

(10) Patent No.: US 12,344,483 B2
(45) Date of Patent: Jul. 1, 2025

(54) SYSTEM AND METHOD FOR CONTROLLING A MOVING ELEMENT ON A CURVED TRACK IN A CONVEYOR SYSTEM

(71) Applicant: ATS Corporation, Cambridge (CA)

(72) Inventors: Roger Hogan, Cambridge (CA); Blake Robert Lambert, Cambridge (CA); Anton Dolgovykh, Cambridge (CA); Braden Jon Guenther, Cambridge (CA); Philip David Munroe, Cambridge (CA); Albert John Kleinikkink, Cambridge (CA); Kenneth Wayne Nicholson, Cambridge (CA)

(73) Assignee: ATS CORPORATION, Cambridge (CA)

( * ) Notice: Subject to any disclaimer, the term of this patent is extended or adjusted under 35 U.S.C. 154(b) by 211 days.

(21) Appl. No.: 18/164,040

(22) Filed: Feb. 3, 2023

(65) Prior Publication Data
US 2023/0242351 A1 Aug. 3, 2023

Related U.S. Application Data

(60) Provisional application No. 63/308,591, filed on Feb. 10, 2022, provisional application No. 63/306,272, filed on Feb. 3, 2022.

(51) Int. Cl.
*B65G 43/10* (2006.01)
*B65G 47/84* (2006.01)
*B65G 54/02* (2006.01)

(52) U.S. Cl.
CPC .......... *B65G 43/10* (2013.01); *B65G 47/846* (2013.01); *B65G 54/02* (2013.01); *B65G 2811/095* (2013.01)

(58) Field of Classification Search
CPC ...... B65G 47/876; B65G 43/10; B65G 54/02; B65G 2811/095
See application file for complete search history.

(56) References Cited

U.S. PATENT DOCUMENTS 4,619,205 A 10/1986 Sticht
6,321,896 B1 * 11/2001 Zuccheri ............ B65G 47/8815
198/419.3

(Continued)

FOREIGN PATENT DOCUMENTS

| CA | 3104958 A1 | 1/2020 |
| EP | 0089543 A1 | 9/1983 |
| FR | 2116222 A1 | 7/1972 |

OTHER PUBLICATIONS

Extended European Search Report, European Patent Office, on corresponding EP Application No. 23154866.0, dated Jun. 21. 2023.

(Continued)

*Primary Examiner* — Gene O Crawford
*Assistant Examiner* — Lester Rushin, III
(74) *Attorney, Agent, or Firm* — Amarok IP Inc.; Neil W. Henderson

(57) ABSTRACT

A conveyor system and method for controlling the same. The conveyor system includes: at least one moving element; a track including: a straight track section with a first mechanism for moving the moving element; and a curved track section connected to the straight track section including a second mechanism for moving the moving element; and a controller configured to control a speed of the moving element as the moving element moves from the straight track section to the curved track section and vice versa such that a velocity profile of the moving element includes a sinusoidal portion to provide a transition from straight to rotary motion or from rotary to straight motion having a linear position profile. In the method, the controller controls (Continued)

at least one of the first mechanism and the second mechanism to move the moving element according to the velocity profile including the sinusoidal portion.

13 Claims, 21 Drawing Sheets

(56) References Cited

U.S. PATENT DOCUMENTS

| | | | |
|---|---|---|---|
| 8,896,241 B2 | 11/2014 | Wernersbach et al. | |
| 9,923,444 B2 * | 3/2018 | Kleinikkink | H02K 41/03 |
| 11,305,946 B2 * | 4/2022 | Shen | B65G 43/00 |
| 11,926,480 B2 * | 3/2024 | Okuhata | B65G 33/04 |
| 2009/0026846 A1 | 1/2009 | Jacobs | |
| 2015/0349618 A1 | 12/2015 | Kleinikkink et al. | |
| 2016/0221767 A1 | 8/2016 | Kamps et al. | |
| 2021/0269259 A1 * | 9/2021 | Lasserre | B65G 37/00 |

OTHER PUBLICATIONS

Extended European Search Report, European Patent Office, on EP Application No. 22155060.1, dated Jun. 24, 2022.

\* cited by examiner

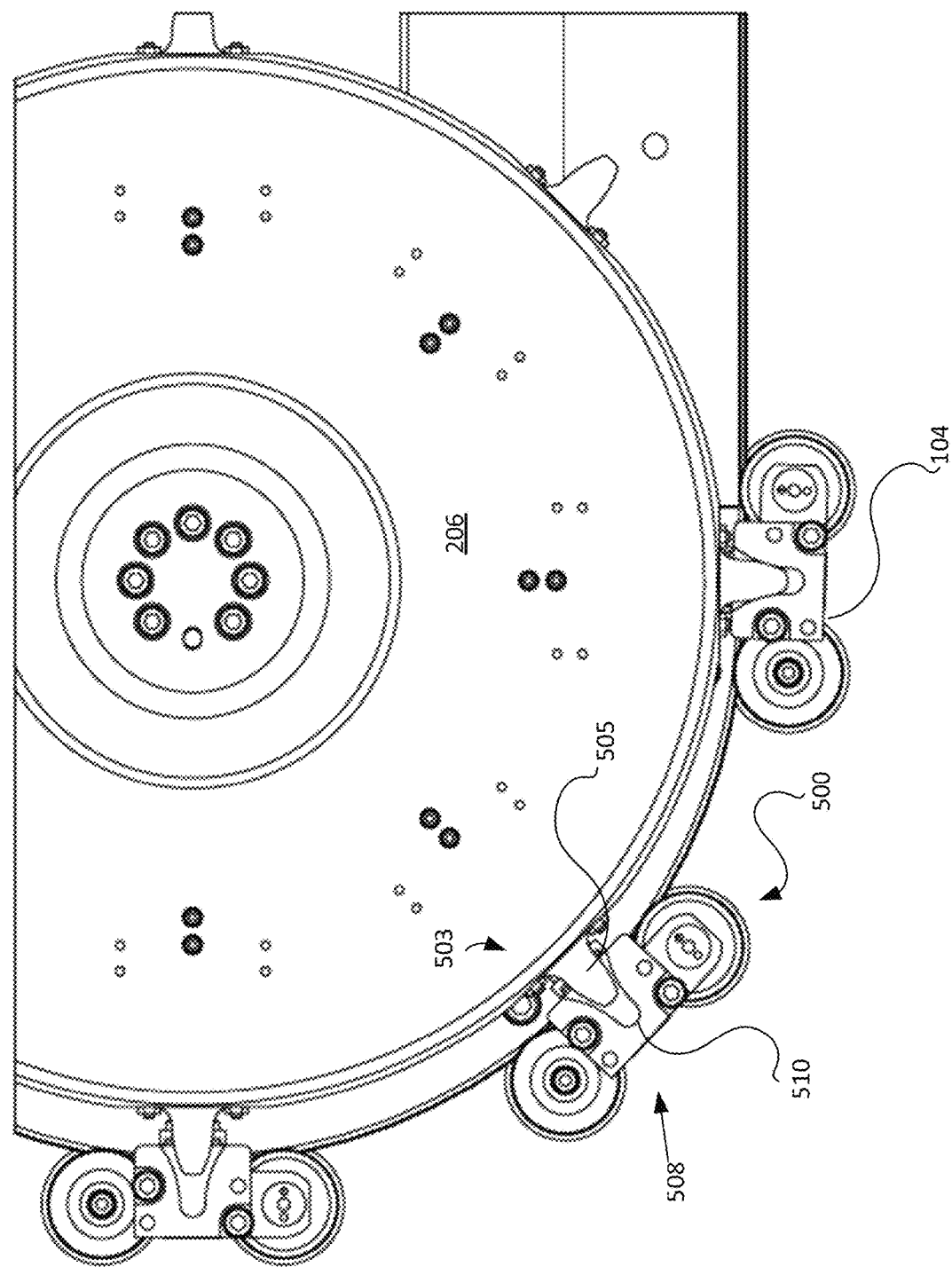

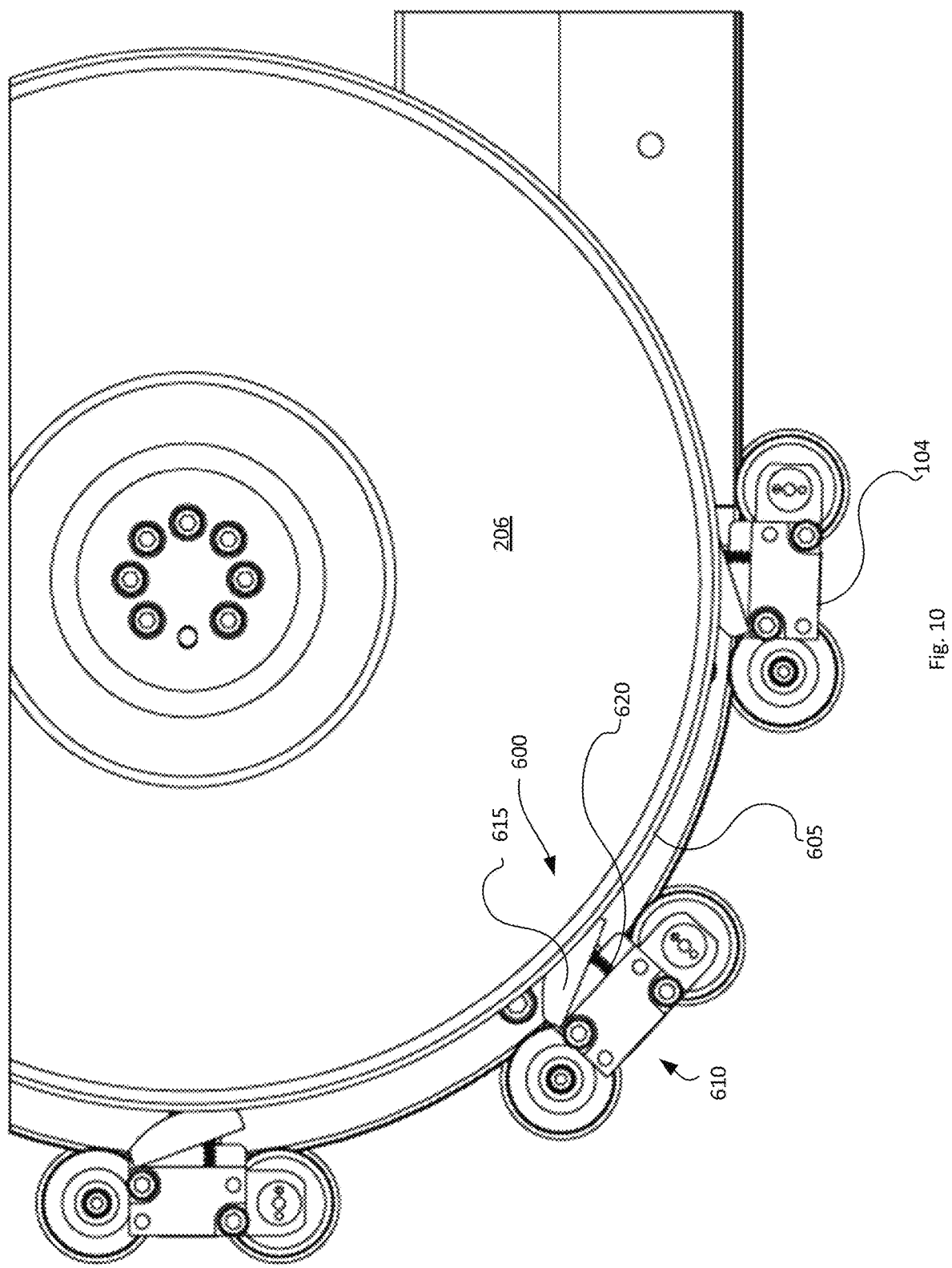

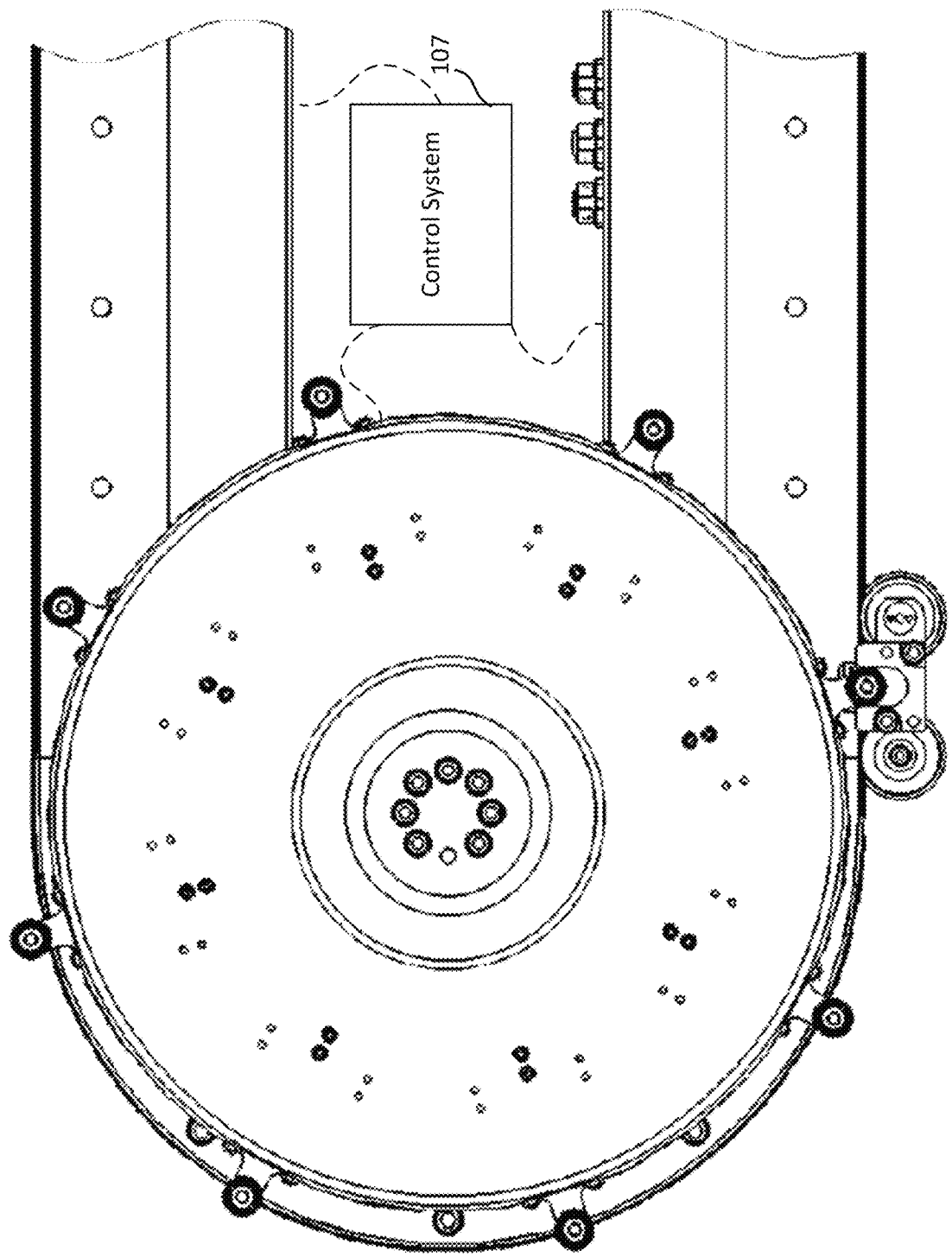

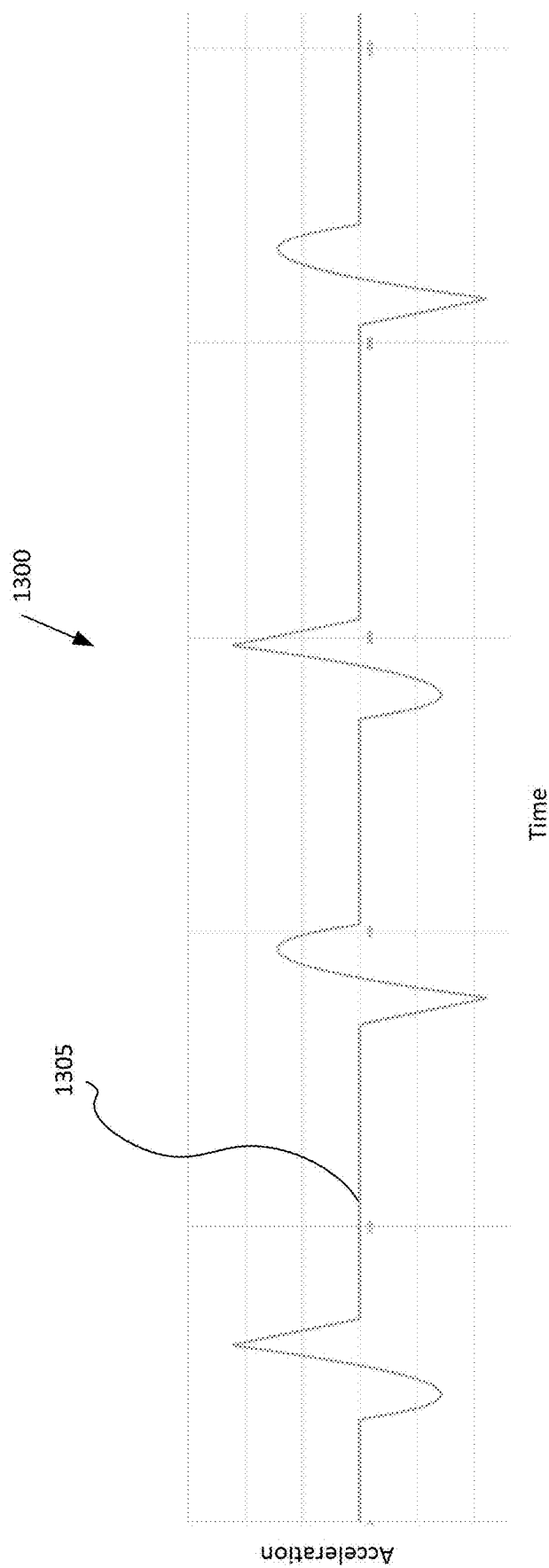

SYSTEM AND METHOD FOR CONTROLLING A MOVING ELEMENT ON A CURVED TRACK IN A CONVEYOR SYSTEM

FIELD

The present disclosure relates generally to a curved track in a conveyor system and, more particularly, to a system and a method for controlling a moving element on a curved track in a conveyor system, wherein the curved track has a rotary drive.

BACKGROUND

In conventional conveyor systems, a moving element is controlled to move along a track, typically via bearings that are provided on the moving element or on the track and may include rails or the like for guiding the moving element. In order to make a conveyor system easier to construct, the track is often formed in sections/modules and the sections are then attached together to form a longer track.

Conventional conveyor systems may be constrained where there are curvilinear or curved sections of track for various reasons. For example, as the radius of the curved section is generally smaller towards the interior of the curve than the exterior of the curve, conventional linear motor systems and, in particular, linear motor conveyor systems, may encounter problems with the arrangement and configuration of moving elements as they travel through curved sections because of the differing forces on the moving element when on a curved section of track and due to changes in velocity and/or acceleration that may occur, particularly during a transition from a straight to a curved section of track.

As such, there is a need for an improved system and method for handling moving elements on curvilinear or curved sections of a conveyor track.

SUMMARY

According to one aspect herein, there is provided a conveyor system including: at least one moving element; a track including: at least one straight track section including a first mechanism for moving the at least one moving element; and at least one curved track section connected to the straight track section including a second mechanism for moving the at least one moving element; and a controller configured to control a speed of the at least one moving element as the at least one moving element moves from the at least one straight track section to the at least one curved track section and from the at least one curved track section to the at least one straight track section such that a velocity profile of the moving element includes a sinusoidal portion. Generally speaking, the sinusoidal portion provides a transition from straight to rotary motion or from rotary to straight motion to provide a linear position profile. In some cases, the sinusoidal portion is configured to provide a linear position profile.

In some cases, the velocity profile may further include a speed match portion in association with the sinusoidal portion. In this case, the speed match portion may include a deceleration and an acceleration configured to provide a smooth entry or exit from the sinusoidal portion. In some cases, for entry to the sinusoidal portion, the deceleration may include a reduction in speed below the entry speed of the sinusoidal portion and the acceleration may include an increase in speed to equal the entry speed to the sinusoidal portion. This approach can be reversed for exit from a sinusoidal portion such that the speed can match the exit speed from the sinusoidal portion, decelerate and then accelerate to match the speed required.

In some cases, the first mechanism may include an electromagnetic drive and the controller may be configured to control the electromagnetic drive to control the speed of the at least one moving element according to the velocity profile to match a constant speed of the second mechanism.

In some cases, the second mechanism may include a rotary wheel provided to the curved track section wherein the rotary wheel may include an engagement mechanism configured to engage with the at least one moving element and move the at least one moving element around the curved track section. In this case, the engagement mechanism may include at least one spoke including a spoke engagement mechanism configured to engage with the at least one moving element. In this case, the at least one spoke may include a bias portion, wherein the bias portion is configured to assist the engagement mechanism to engage with the at least one moving element.

According to another aspect herein, there is provided a method for transitioning between a straight track section and a curved track section of a conveyor, the method including: moving a moving element on the straight track section toward the curved track section or from the curved track section toward the straight track section; and controlling a speed of the moving element as it transitions from the straight track section to the curved track section or from the curved track section to the straight track section such that a velocity profile of the moving element may include a sinusoidal portion. Generally speaking, the sinusoidal portion provides a transition from straight to rotary motion or from rotary to straight motion to provide a linear position profile. In some cases, the sinusoidal portion is configured to provide a linear position profile. In a particular case, when moving from a variable speed straight track section to a constant speed curved track section, the sinusoidal portion moves from a reduced speed to an intended speed along a sinusoidal path to provide a linear position profile.

In some cases, the velocity profile further may include a speed match portion in association with the sinusoidal portion. In this case, the speed match portion may include a deceleration and an acceleration configured to provide a smooth entry or exit from the sinusoidal portion. In particular, for entry to the sinusoidal portion, the deceleration may include a reduction in speed below the entry speed of the sinusoidal portion and the acceleration may include an increase in speed to equal the entry speed to the sinusoidal portion. This approach can be reversed for exit from a sinusoidal portion such that the speed can match the exit speed from the sinusoidal portion, decelerate and then accelerate to match the speed required. Similarly, for exit from the sinusoidal portion, the deceleration comprises a reduction in speed below the exit speed of the sinusoidal portion and the acceleration comprises an increase in speed to equal the required speed of the track.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 9 illustrates another embodiment of an engagement mechanism between the star wheel and the moving element involving an involute gear-like connection;

FIG. 10 illustrates another embodiment of an engagement mechanism between the star wheel and the moving element involving a friction connection;

FIGS. 11A-11I illustrate a motion of the moving element from approaching the star wheel, around the star wheel, to leaving the star wheel; FIG. 13 illustrates acceleration vs. time for the moving element as it moves through the actions shown by FIG. 12.

DETAILED DESCRIPTION

Generally, the present disclosure provides an improved system and method of controlling a conveyor. In particular, the handling of transitions from straight to curved track sections of a conveyor and vice versa. In some embodiments, the curved track section makes use of a rotary wheel driven by a motor such as a servo motor or the like. In some cases, the straight track section(s) may be driven by an electromagnetic motor drive, servo motor drive or the like. As moving elements travel along the conveyor, there are generally one or more straight sections followed by a curved track section and then further straight track sections. The curved track section may be a turn through any number of degrees but are typically 45, 90, 135 or 180 degrees or the like. In some cases, the curved track section may be a transition between straight track sections, or may itself be driven via different types of motor drives. The present disclosure uses a rotary driven curved track section between variable speed straight sections, which may include additional support for the moving element during the curved transition. This additional support is intended to provide for a smoother transition between straight sections, via the curved section, and provide for an agnostic solution as the moving element may transition between differently driven conveyor track sections (curved or straight).

Conventional conveyor systems tend to be constructed through a combination of straight and curved track sections. Conventionally, a single drive system may be used to drive all sections in a given conveyor system. However, in a linear motor conveyor track, an electromagnetic drive can be costly and the kinematics of an electromagnetic drive for a curved section may require a larger minimum radius than for a differently driven curved section, which may impact the overall footprint of the conveyor system.

As users of conveyor systems may want to include sections of track that are driven via different motor drives, or may want to include curved sections with a smaller radius than may be offered in a conventional system, a system and method for controlling on a curved track may be preferred. In the system and method provided herein, the curved track section may include a rotary driven star wheel having radial spokes for engaging a moving element. In some cases, the spokes may include a biasing member for providing engagement between the spoke and the moving element, although it should be noted that the biasing member is not required for all embodiments.

In the following description, the examples relate to a linear motor conveyor system (for at least the straight sections) but the same or similar system and method can generally be used with other conveyor systems or hybrid conveyor systems that require a curved track section.

Figure 1:
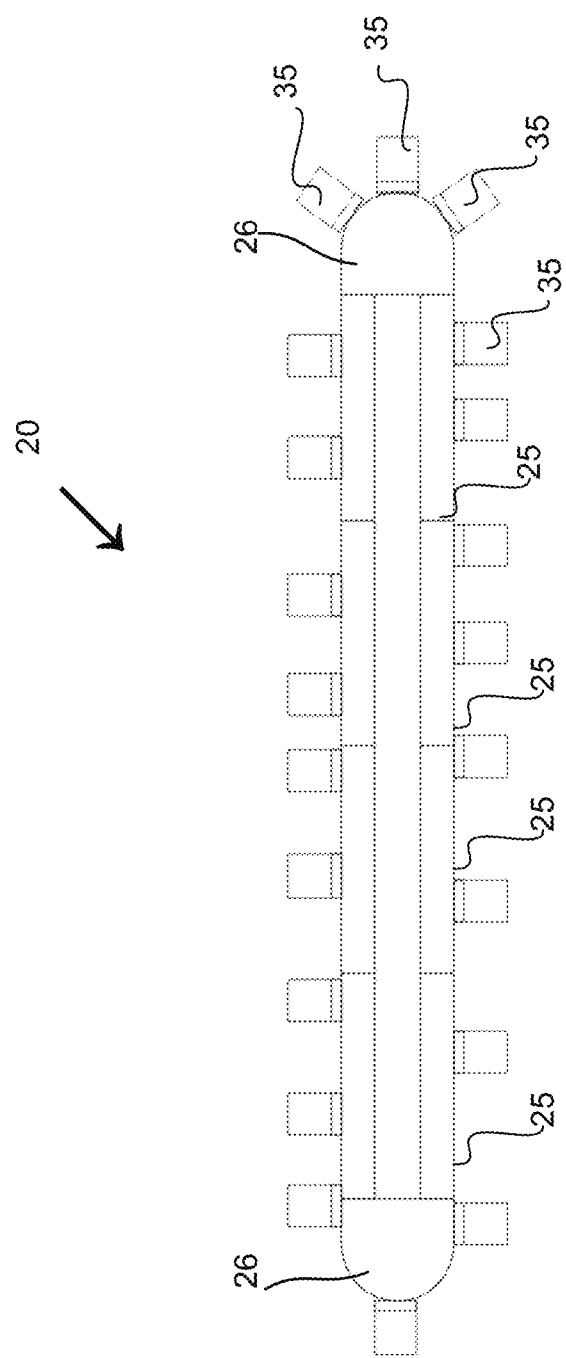
FIG. 1 shows a schematic drawing of an embodiment of a conveyor system that includes a track, made up of track section, and moving elements.

FIG. 1 shows a schematic diagram of an example conveyor system 20. The conveyor system 20 includes one or more track sections 25, 26 defining a track. In FIG. 1, a plurality of straight track sections 25 are provided with two curved sections 26. A plurality of moving elements 35 are provided to the track and move around on the conveyor system 20. In a manufacturing environment, the moving elements 35 are intended to travel between workstations (not shown) and may support a pallet or product (not shown) that is to be operated on automatically by, for example, a robot, while moving or at a workstation or may travel to a workstation or other work area intended for manual operations. Through the operation of the conveyor system 20, various operations are performed to provide for the assembly of a product. In this disclosure, the terms "moving element" and "pallet" may sometimes be used interchangeably, depending on the context.

Figure 2:
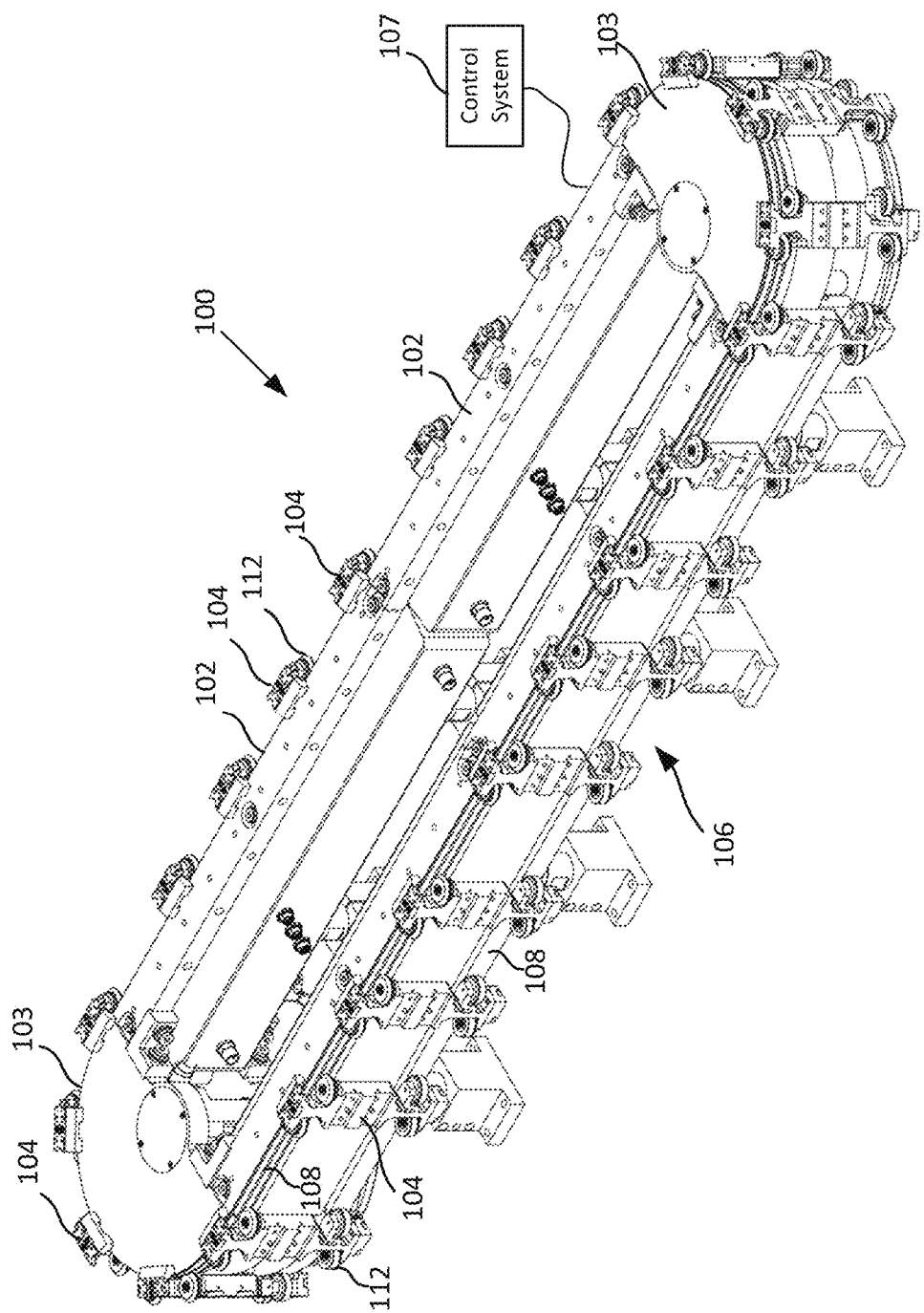
FIG. 2 shows a perspective view of an embodiment of a conveyor system that includes a track, made up of track section, and moving elements.

FIG. 2 illustrates a perspective view of another example linear motor conveyor system 100 having one or more track sections 102, 103 defining a track 106, and one or more moving elements 104 which are configured to ride, move or travel along the track 106. In FIG. 2, there are four straight track sections 102, and two corner track sections 103, and a plurality of moving elements 104. However, it will be understood that the modular nature of the track sections allow for various sizes and shapes of conveyors and any appropriate number of moving elements. In FIGS. 1 and 2, the corner (or curved) track sections 103 are 180 degree turns but in some configurations the curved track sections 103 may have different angles such as 45, 90, 135 degree angles or the like. Some of the principles of operation of a similar track section are described in more detail in, for example, U.S. Pat. No. 8,397,896 to Kleinikkink et al., which is hereby incorporated herein by reference.

As noted, the conveyor system 100 may include a plurality of track sections 102, 103, which are mechanically self-contained and separable from one another so as to be modular in nature. In order to be modular, each track section 102, 103 may house electronic circuitry and/or mechanical parts for powering and controlling the related track section 102, 103 and/or there may be a controller/control system 107 that controls the related track section or the track 106 overall (only one controller is shown but other controllers for track sections may be included as well). In some cases the track controller may communicate or interface with track section controllers provided for each of the track sections 102, 103. The controller(s) may include a processor that executes a program stored on a machine readable medium. The machine readable medium may be a part of the controller or at a remote location or the like.

In a linear motor conveyor system 100, the track 106 may produce a magnetic force for moving the moving element 104 along the track 106. The magnetic force can also capture, support or hold the moving element 104 on the track 106. The magnetic force is at least partly generated by the interaction of the magnetic flux created by embedded coils of the track 106 and magnetic elements of the moving element 104. It will be understood that conveyor systems with different motor drives may be driven in other manners.

Figure 3:
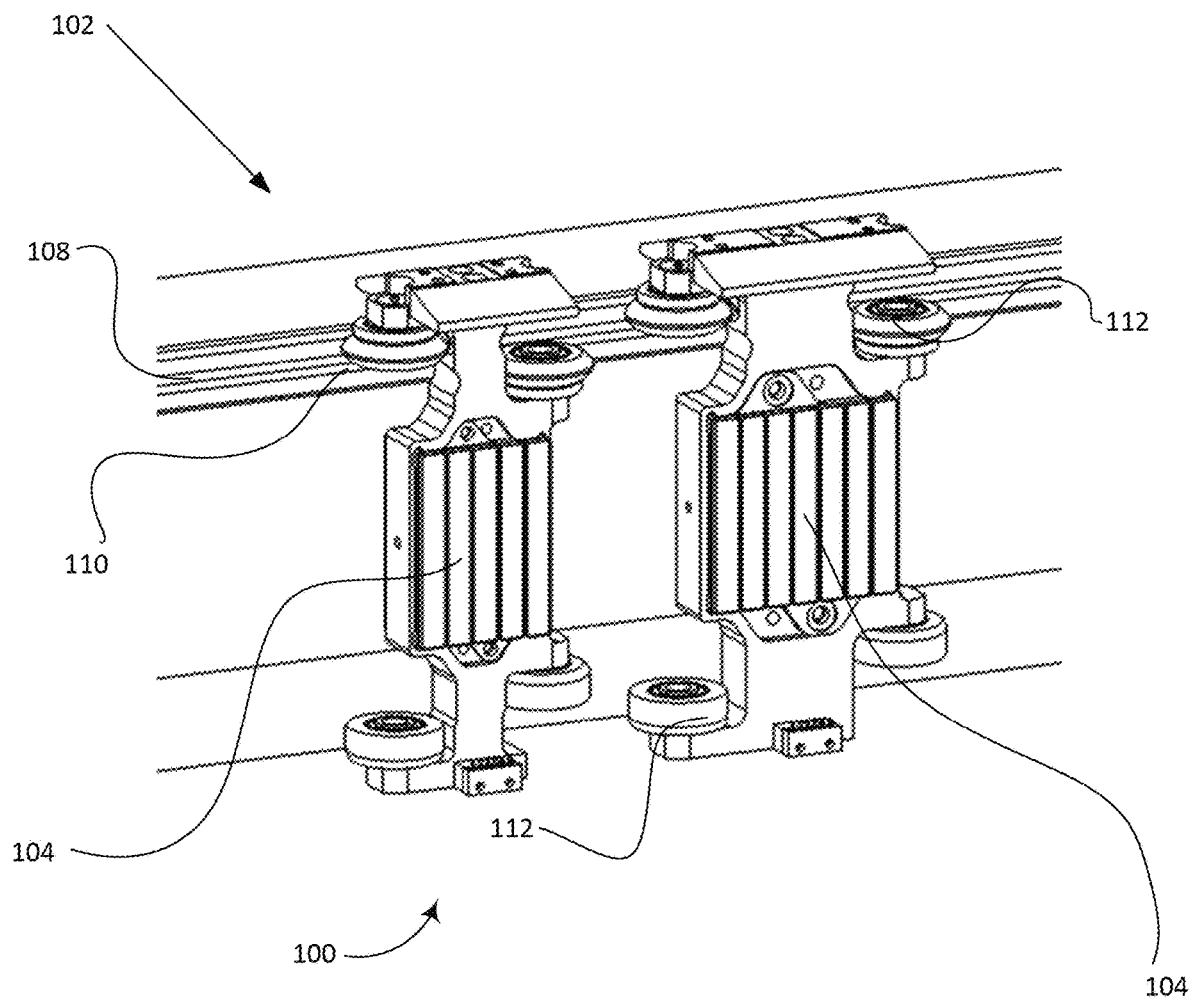
FIG. 3 shows a view of an embodiment of a track section having two moving elements on it.

FIG. 3 illustrates an embodiment of a linear motor conveyor system 100 that includes a straight track section 102 and two moving elements 104. The track 102 may be made up of track sections 102, joined end-to-end, with one or more guide rails 108 of each track section 102 aligned with a guide rail 108 of adjacent track sections 102. In this embodiment, the track section 102 includes a guide rail 108 located in an upper portion of track section 102, and the guide rail 108 has dual shaped grooves 110, a lower guide rail 108 is flat. The moving elements 104 include bearings 112 that are correspondingly shaped in order to run along a corresponding guide rail 108, each bearing 112 running inside a respective shaped groove 110. The bearings 112 may be offset and such that for a moving element 104 having two shaped bearings 112, each shaped bearing may run inside a separate respective shaped groove 110.

In some embodiments, the track section 102 may produce a magnetic force for moving the moving element 104 along the track 102. The magnetic force can also capture/hold the moving element 104 on the track 102. In some cases, the magnetic force is created by the interaction of the magnetic flux created by coils (not shown) embedded in/under the track section and magnetic elements (not shown) of the moving element 104. The magnetic force can be thought of as having a motive force component for directing movement of the moving element 104 along a direction of travel on the track 102, and a capturing force component to laterally hold the moving element 104 on the track 102 and in spaced relation to the track surface. In at least some conveyor systems, the motive force and the capturing force can be provided by the same magnetic flux.

Generally speaking, the track sections 102, 103 will be mounted on a support structure (not shown) so as to align and abut one another in order to form the track 106. As noted above, each track section may be controlled by a control system or by a track control system 107 that controls a plurality of or all of the track sections.

In embodiments herein, reference numbers of elements may refer to those of the conveyor illustrated in FIGS. 2 and 3, however, this is for reference to similar elements only and elements of each embodiment may be used with other embodiments as would be appropriate for the application desired.

Where there are curvilinear or curved track sections in a linear motor conveyor system, conventional linear motor systems may be constrained due to the nature of the linear motor used. As the radius of the curved section is generally smaller towards the interior of the curve than the exterior of the curve, conventional linear motor conveyor systems can encounter problems due to the positioning of coils for the motor. In order to overcome this difference in radius, some conventional linear motor conveyor systems may have coils that fan out towards the exterior of the curve, which may cause inconsistencies in magnetic flux. Other conventional systems may have each loop of the coil in the curved section at a different angle than the loops adjacent to it; which may be difficult to construct and may require complex control systems to drive the coils. As well, with coils that fan out or at different angles, there may be difficulty in constructing and operating interleaved coils.

Conventional linear motor conveyor systems with curvilinear or curved track sections may also produce unwanted forces on a moving element traversing the curved track section. The excessive forces may be caused by undesirable rates of change of acceleration, hereinafter called "jerk". Jerk can have unwanted consequences, such as shifting components being carried by the moving element or the like. Jerk may be especially pronounced at the transition point between the curved section of track and a straight section of track. As such, some conventional conveyor systems may limit the speed of the moving elements as they travel through the curved track section to minimize jerk. However, limiting speed may constrain the overall conveyor system throughput.

Conventional linear motor conveyor systems also may have some bearings/wheels of a moving element experience different forces or rotate at a different speed than other bearings/wheels of the moving element when on a curve. This effect may be especially pronounced where the moving element travels on a top surface of a track. This effect may produce undesirable wear on the bearings/wheels and require that the bearings/wheels be made out of expensive material to resist wear, or require that expensive and complex differential systems be implemented on the moving element. Some linear motor conveyor systems may also require a contact surface for support or guidance around a curve. Such a contact surface may require a mechanism to engage/disengage with moving elements (or, in some cases may even be present on the full conveyor) which can introduce friction and thereby become a wear element that may generate debris. In embodiments herein, the moving elements can be configured to travel around the curve without requiring any external contact support or guidance (for example if attracted/supported on the track by a magnetic force).

Embodiments of the system for a rotary motor curved track section detailed herein are intended to be used along with a conveyor having curved and straight track sections and, in particular, straight track sections that are driven by a linear motor. However, different drive systems may also be used for the straight track sections. The system is intended to include a rotary driven motor and a star wheel. In some cases, the rotary motor may be a servo-motor or the like. As the moving element moves from a straight section, driven by, for example, a linear motor, to a curved section, the moving element is configured to engage with the star wheel via, for example a spoke. The star wheel rotates, thereby moving the shuttle along the circumference of the curved track section. In some cases, for a linear motor driven conveyor system, the magnetic force from the moving element can still be used to hold the moving element against the track, acting against the centripetal force and acceleration around the curve.

Figure 4:
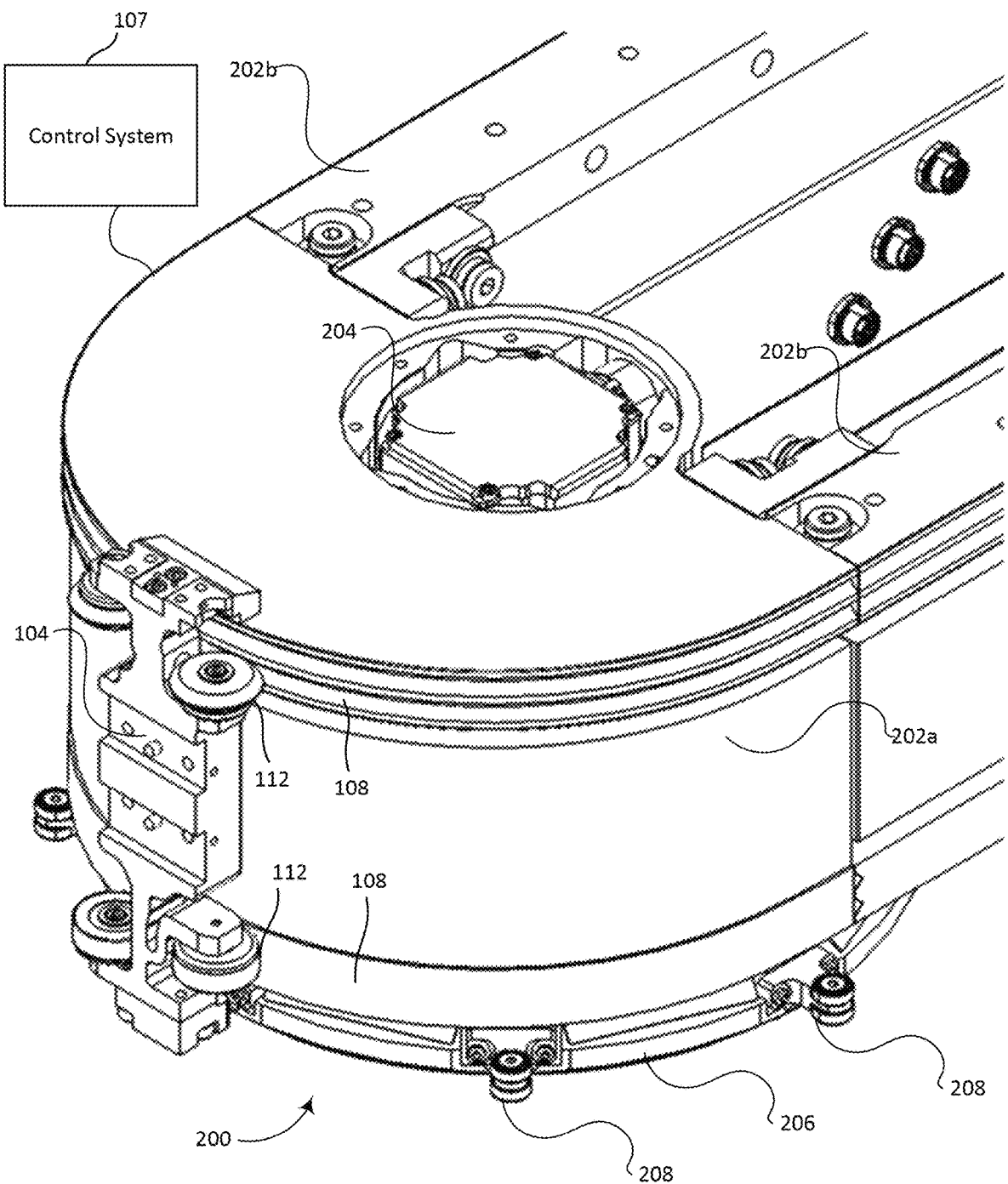
FIG. 4 illustrates an embodiment of a system for a motor driven curved track section on a conveyor system.

FIG. 4 illustrates an embodiment of a system for a rotary drive curved track 200 when applied to a curved track section 202a of a conveyor. In this example, a conveyor includes a transition from a straight track section 202b to the curved track section 202a to a further straight track section 202b. The system 200 includes a rotary drive 204 for driving a star wheel 206. The rotary drive 204 and star wheel 206 are configured to work with the curved track section 202a. The star wheel 206 is configured to engage a moving element 104 as the moving element 104 transitions onto the curved section 202a. In this embodiment, the star wheel 206 includes a plurality of radial spokes 208 and the star wheel 206 may engage each moving element 104 via a related radial spoke 208. Each spoke 208 may include a spoke engagement mechanism (not shown in FIG. 4 but described below) which is intended to provide engagement with the moving element as it enters and traverses the curved track section 202a.

Figure 5:
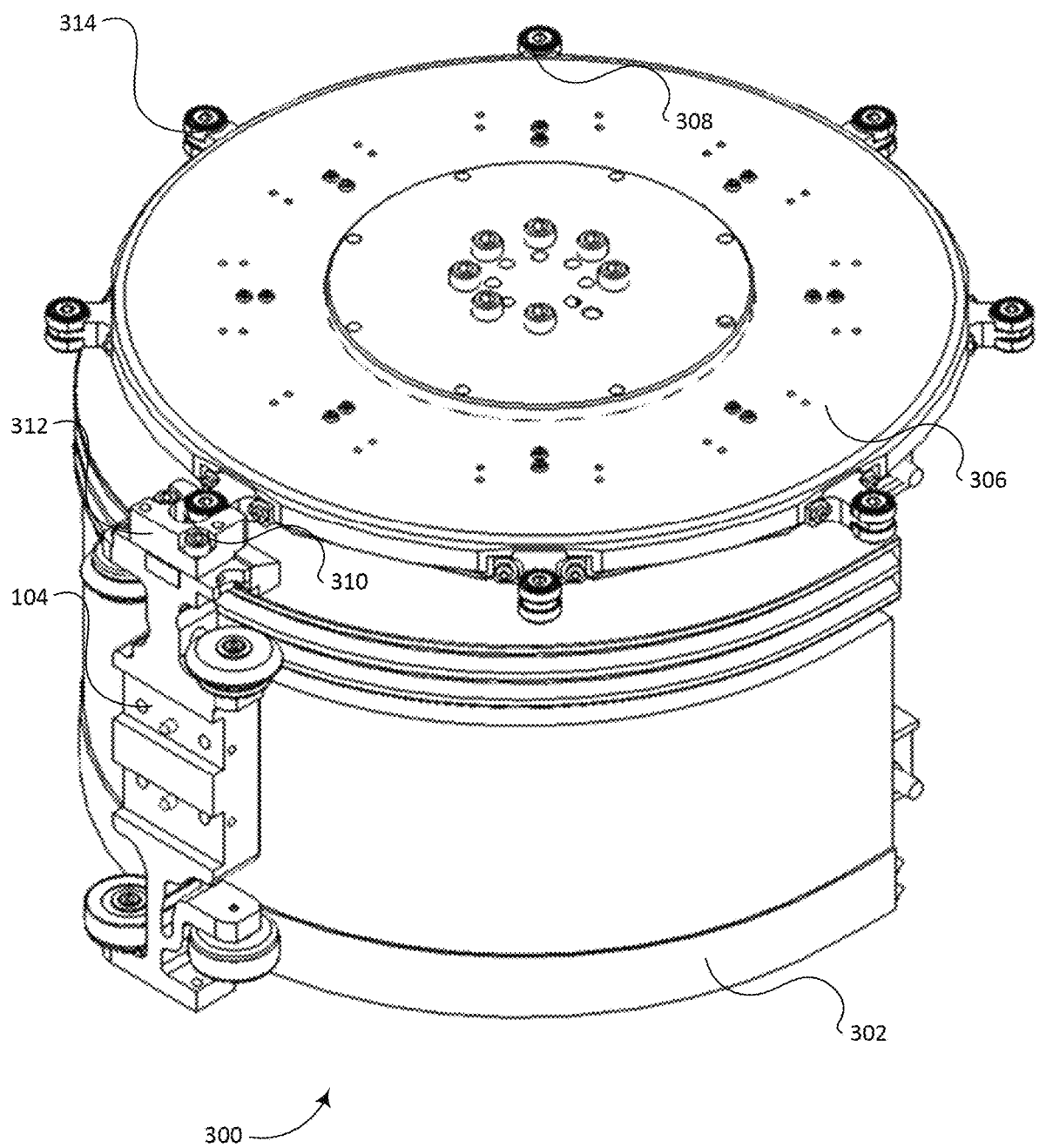
FIG. 5 illustrates another example embodiment of a system for a motor driven curved track section.

FIG. 5 illustrates an alternative embodiment of a system for a rotary drive curved track 300 as applied to a curved track section 302. The system 300 is similar to the system 200 shown in FIG. 4, but is located on the top of the curved track section 302 as opposed to the bottom of the curved track section 202a. Similar to FIG. 4, the curved track section 302 may be operatively connected with straight conveyor track sections that may use various drive types, for example, an electromagnetic linear motor drive, a servo-motor drive or the like. The system 300 includes a star wheel 306 driven by a rotary drive (not shown). The star wheel 306 includes at least one spoke 308 projecting radially from an external perimeter of the star wheel 306 and extending a predetermined amount outside of the perimeter of a rail of the curved track section 302. The number and shape of spokes per star wheel may depend on the radius of the star wheel, radius of the curved track section, the setup of the moving elements on the conveyor system, speed of movement of the star wheel, and the like. Generally speaking, the number/spacing of spokes and radial distance between spokes is limited by the minimum pitch of the moving elements. It is possible to add spokes to this limit depending on the application.

In this arrangement of the star wheel, the curve can be more compact because the curve does not require a drum/hub to both support and transport the moving elements around a corner. The star wheel can be mounted above or below the track and engage with the moving element via the spokes extending over the edge of the track.

In this embodiment, each spoke 308 is configured to be received by a moving element engagement mechanism, such as, for example, recess 310 of the moving element 104. In some cases, the moving element may be retrofitted with an addition 312 including the recess 310, which is intended to allow currently used moving elements to continue to be used on a conveyor system having the system 300 for the curved track section. In other cases, the moving element may be designed as a single unit with an engagement mechanism such as the recess corresponding to a shape of a spoke on the star wheel. At a connecting end of each spoke 308, the moving element engagement mechanism may include a bearing 314 or ball correspondingly shaped to the recess 310. Although the recess 310 is shown as a curved recess in this figure, it will be understood that other shapes of recesses may be used, and the spoke may include a correspondingly shaped bearing or the like.

In some cases, the bearing of the spoke may be made of a material with slight give, flexibility, or the like, to ensure the bearing may still operatively engage the recess even if the recess includes slight manufacturing tolerances or misalignments.

Figure 6:
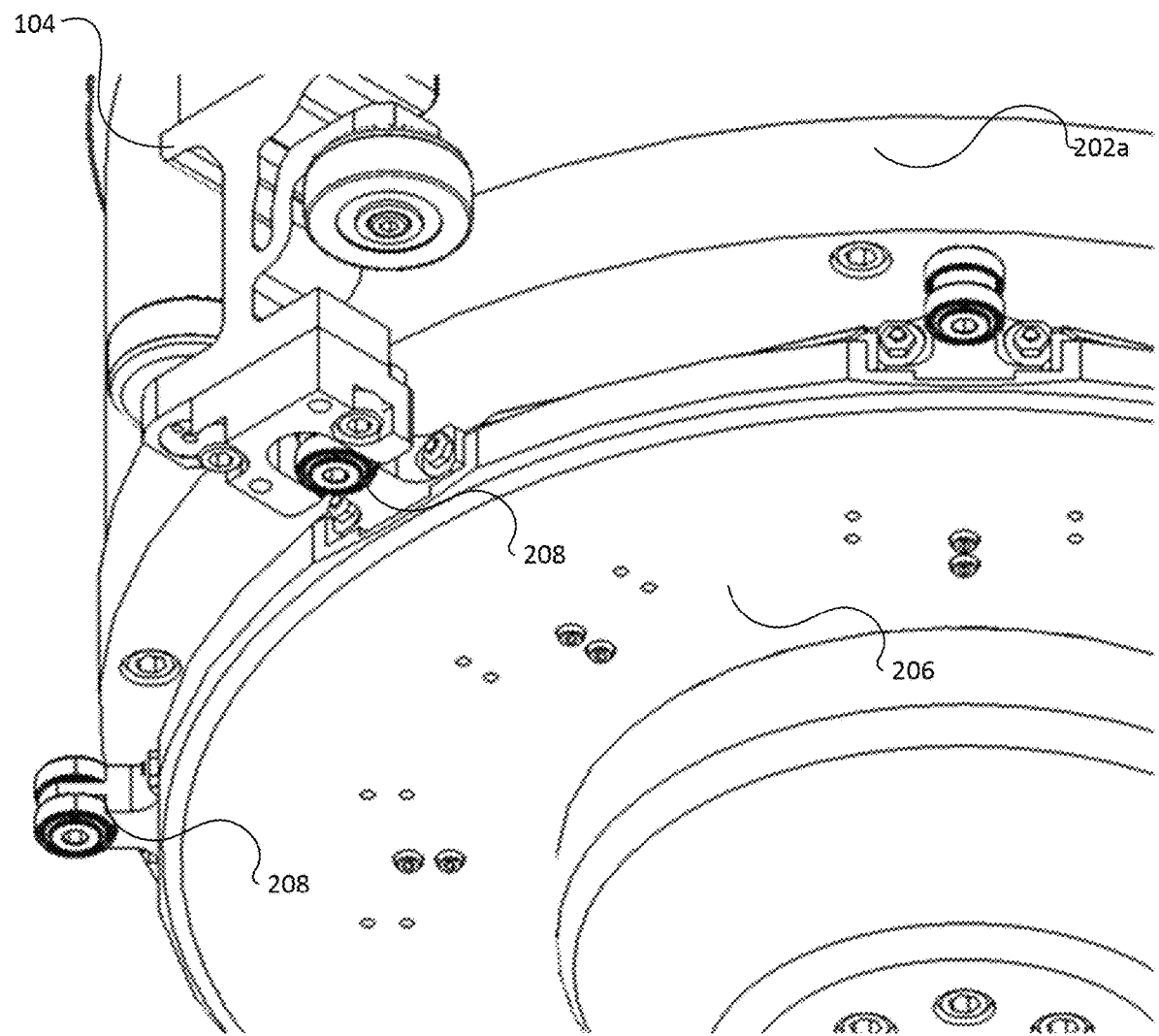
FIG. 6 shows the interaction between the star wheel and moving element.
Figure 7:
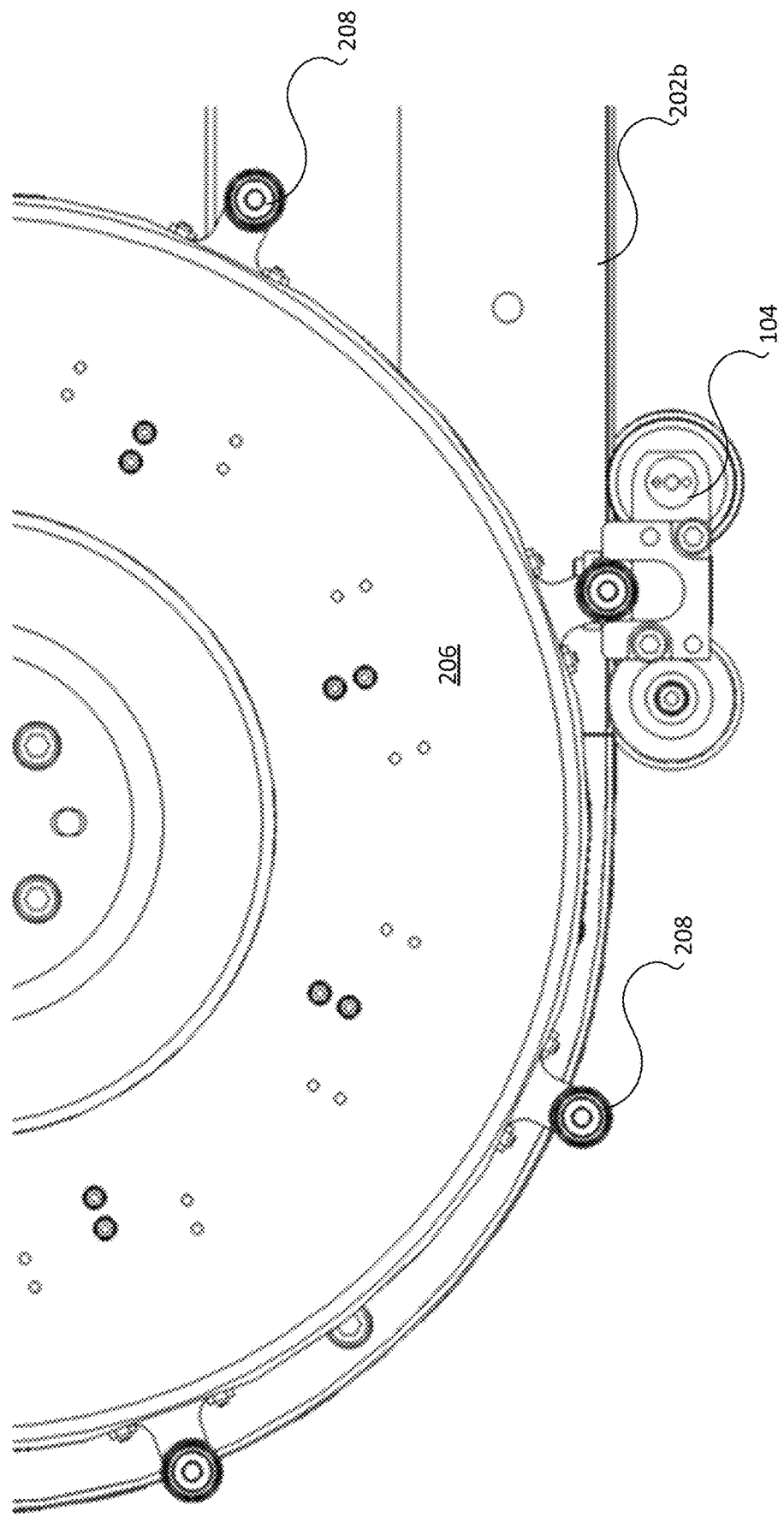
FIG. 7 shows the transition from a curved track section to a straight track section using the system.

FIG. 6 illustrates the engagement of the moving element 104 on a spoke 208 of the star wheel 206 for the system shown in FIG. 4. FIG. 7 is a bottom view illustrating the transition from a straight track section 202b to the system 200.

As illustrated in FIG. 7, the moving element 104 travels along the straight track section and is controlled by the controller to adjust its position, speed and the like. As noted above, the straight track section may be driven by an electromagnetic linear motor drive, a servo-motor drive or the like. On reaching the curved track section 202a, the moving element 104 is controlled by the controller to match its approach such that the controller can control the rotary motor to drive the star wheel 206 such that the spoke 208 of the star wheel 206 engages the moving element 104. Generally speaking, the controller 107 controls both the straight track section and the rotary motor to have the spoke 208 engage with the moving element 104. However, in some cases, one of the straight track section or rotary motor may be moving at a predetermined speed or having a predetermined speed profile while the other of the straight section or rotary motor may be adjusted by the controller to cause the engagement.

In this embodiment (as shown in FIG. 7), the spoke 208 engages the moving element 104 via a moving element engagement mechanism provided to the moving element 104 (such as a recess formed in the moving element or in an addition attached to the moving element 104). The rotary drive motor rotates the star wheel 206 and spoke 208 around the curved track section 202a as illustrated in FIG. 6. The use of an engagement mechanism such as the spoke 208 and recess 210 allows for the mechanical control of the moving element 104 as it moves around the curved track section 202a. In this embodiment, the moving element 104 can also be held against the curved track section 202a via a magnetic attraction between the moving element (for example, a magnet in the moving element) and the curved track section 202a (for example, a steel structure or the like in the curved track section). However, in other embodiments, the spoke and engagement mechanism on the moving element may be configured to provide additional mechanical support or locking of the moving element so that control is maintained. In any event, the engagement between the spoke and the moving element is configured to allow the controller to maintain information about the location of the moving element and control of the moving element's movement.

Following rotation around the curved track section 202a by the system 200, the moving element 104 is moved/transitioned onto a second straight track section 202b. The second straight track section 202b may be driven by the same type of drive or a different type of drive system than the first straight track section. In this embodiment, the star wheel 206 transitions the moving element 104 to the second straight section 202b via an opposite process of that illustrated in FIG. 7, wherein the spoke 208 moves the moving element onto the straight track section 202b and disengages from the engagement mechanism (recess 310) of the moving element 104. The controller then controls the straight track section 202b to move the moving element 104 further down the conveyor.

The system shown in FIG. 5 would operate in a similar manner but star wheel and spoke(s) would be at the top of the curved track section.

In some embodiments, the star wheel/rotary drive may be configured to allow for queueing or stopping/holding moving elements on the curved track section. For example, queuing/buffering may include the ability to slow down and speed up as well as stopping for a predetermined time period and starting as needed. In some embodiments herein, control of the star wheel (and thus movement of the moving elements on the curved track section) can be controlled independently of but in co-ordination with the straight track sections (and thus movement of the moving elements on the straight track sections) even in high throughput applications. For stopping/holding, this can occur, for example, when a moving element is stopped to perform some operation/task on the curved track section. Because of the flexibility of control, this task/operation could be something that occurs every cycle or something that occurs occasionally such as removing a rejected part or performing an audit. Further, the amount of time of the stop or hold can also be programmable. Still further, the stopping/holding location can be programmable because the star wheel can be programmed to stop or hold at any position along the curved track section.

In some embodiments, the star wheel and rotary drive can be controlled to move the moving element onto the curved track section and then reversed to return the moving element to the same track section. This may be useful in, for example, situations where one or more moving elements are to be queued at a point in the manufacturing cycle and then returned.

In some cases, even if the curved track section includes a magnetic motor providing electromagnetic forces to hold and/or move the moving element, the star wheel and spoke may be provided in order to provide additional support/control for moving the moving element around the curved track section. In these cases, the star wheel may be driven or not-driven depending on the application.

In general, the system herein is intended to be agnostic with respect to the drive system of the conveyor system. In some cases, the straight track sections and the curved track section may all have different drive types, or the straight track sections may be of the same drive type, or there may be multiple drive types in any given track section.

Figure 8:
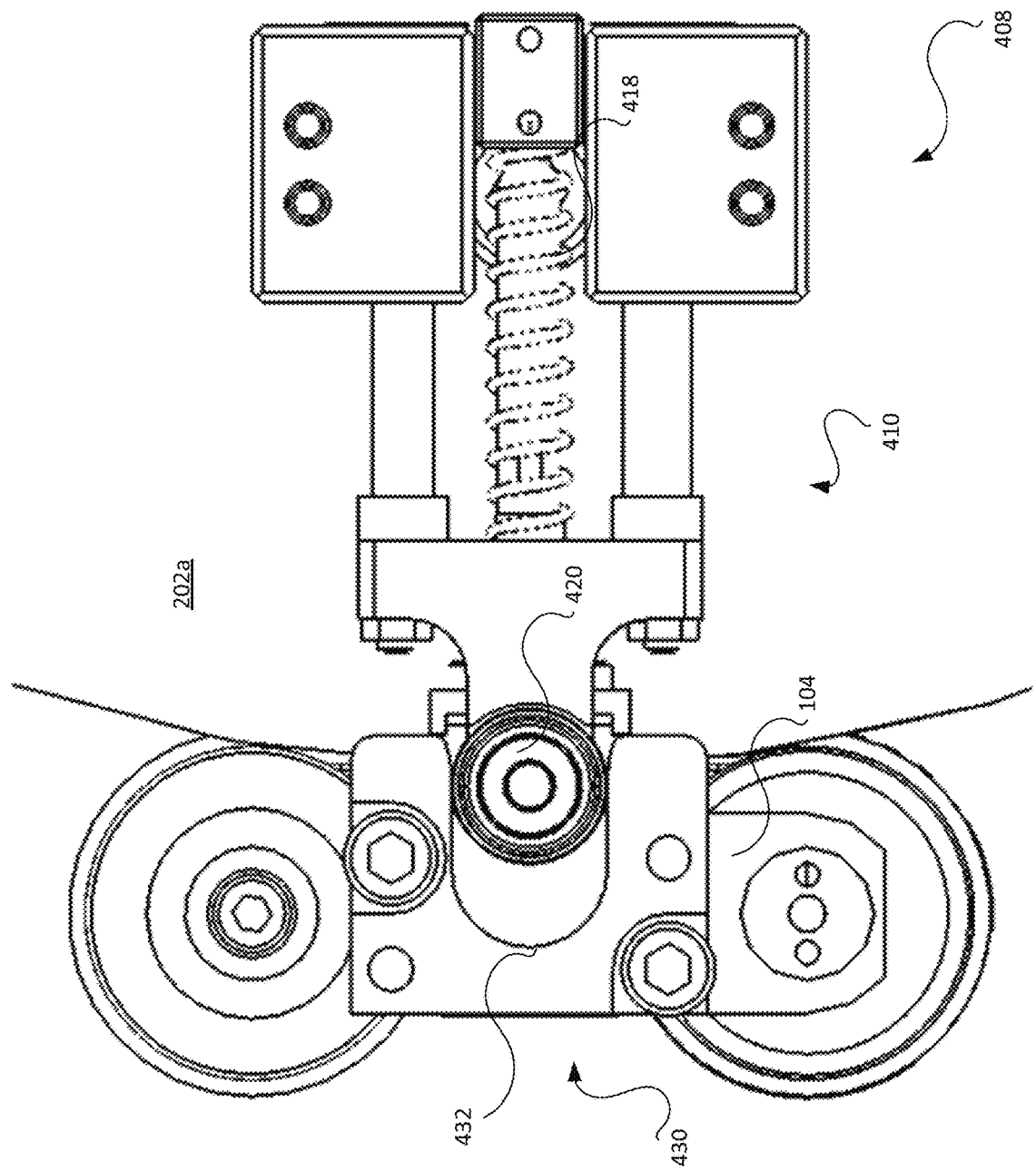
FIG. 8 illustrates an embodiment of an engagement mechanism between the star wheel and the moving element involving a biasing member.

FIG. 8 illustrates an embodiment of a spoke 408 that may be used as a spoke for embodiments of the system. While a particular spoke arrangement is described herein, it is intended to be indicative of the principles involved and other formats/embodiments of an engagement mechanism may use similar or related principles or concepts and achieve the same or similar results. In this embodiment, each spoke 408 includes a spoke engagement mechanism 410 for engaging with the moving element 104. In this case, the spoke engagement mechanism 410 includes a biasing member 418 to provide bias to the spoke as it engages with and disengages from the moving element 104. The biasing member 418 may be a spring or like construction designed to allow the spoke to flex in one or more directions in the event the spoke does not directly engage the moving element. In some embodiments, a separate biasing member may not be needed. The spoke engagement mechanism 410 may further include a bearing 420 or other form of connector at an end of the spoke and coupled with the biasing member. The moving element 104 receives this connector/bearing 420, via a moving element engagement mechanism 430, for example a recess 432, in order to provide support and movement of the moving element around the curved track section via the star wheel. In some cases, the recess 432 may have a slightly chamfered entrance to allow for some level of misalignment or machining tolerances or the like with the bearing 420 during engagement. Although a generally circular/semi-circular connector/bearing and recess are shown, it will be understood that these are intended to be cooperatively shaped components and may be shaped or formed in other manners. In some cases, the spoke engagement mechanism 410 and the moving element engagement mechanism 430 may together be referred to as an "engagement mechanism".

FIG. 9 illustrates another embodiment of an engagement mechanism 500 between the star wheel and the moving element. In this case, the star wheel includes a spoke 503. In this case, the spoke 503 includes a spoke engagement mechanism 505, which is an elongated head 505, that extends beyond the boundary of the star wheel. In some cases, the elongated head 505 may have a predetermined level of flexibility to provide bias to the elongated head as it engages with and disengages from the moving element 104. The moving element 104 receives this elongated head 505, via a moving element engagement mechanism 508, for example a recess 510. In some cases, the recess 510 may have a wider entrance to allow for some level of misalignment or machining tolerances or the like with the elongated head 505 during engagement. In this embodiment, the engagement mechanism is somewhat like an involute gear tooth engaging with a corresponding recess.

In FIGS. 8 and 9, the engagement mechanism represents an example of a synchronized engagement option. In these examples, the spoke or star wheel engagement mechanism is generally timed to be synchronized with the moving element engagement mechanism. A synchronized engagement can assist if there are higher forces involved, such as can be the case with fast moving conveyors.

FIG. 10 illustrates another embodiment of an engagement mechanism 600 between the star wheel and the moving element. In this case, the star wheel includes a star wheel engagement mechanism that is, for example, a friction surface 605. The moving element 104 includes a moving element engagement mechanism 610 that includes a friction pad 615 and a biasing mechanism 620, in this case a spring 620, which biases the friction pad 615 against the friction surface 605. In this example, the engagement mechanism 600 does not need to be synchronized as the moving element can engage with the star wheel as it enters the curved track section. In this case, the star wheel generally may not need to be controlled as precisely as the synchronized engagement mechanisms.

One of the aspects of having differently driven straight sections vs. curved sections is the difficulty in matching a velocity profile of the moving element on each of the different track sections as the moving element moves between track sections. In particular, the moving element can be engaged with two different drive systems on two track sections at the same time. While there will be situations where the velocity of the moving element on a straight section will generally be the same as on the curved section, there can be a portion of track where the curved section meets the straight section where velocities may not match exactly due to the need to "pick-up" the moving element. FIGS. 11A to 11I illustrate a motion of the moving element 104 from approaching the star wheel, around the star wheel, to leaving the star wheel. FIG. 12 illustrates a chart 1200 showing the position/velocity vs. time for the moving element as it moves through the motion shown by FIGS. 11A to 11I. FIG. 13 illustrates a chart 1300 showing the acceleration 1305 vs. time for the moving element, similar to FIG. 12. It was determined that special considerations had to be applied to the speed of the moving element during the hand-off of the moving element because of the change in the type of motion from linear to circular/curved and vice versa. Although examples herein relate to one type of transfer involving a linear motor straight section having a first mechanism for moving the moving element, i.e. an electric linear motor, and a rotary wheel having a second mechanism for moving the moving element, i.e. a servo-driven motor, the principles generally apply to any transition from linear to circular/curved and vice versa.

As illustrated in FIGS. 11A to 11C, 11G to 11I, 12 and 13 and described below, embodiments herein include a controller 107 that controls a speed of the moving element as the moving element approaches, engages, disengages and departs the star wheel. In other embodiments, the controller 107 may control the speed of the star wheel while the speed of the moving element on the straight section may be a predetermined speed, which may be constant. In still further embodiments, the speeds of both the star wheel and the moving element on the straight section may be adjusted simultaneously to achieve a similar velocity profile as that shown in FIG. 12. These aspects are illustrated by the dotted lines connecting the controller 107 to the straight sections and the star wheel.

In FIG. 12, the position 1205 of a moving element is the linear cumulative position around the track starting at, for example, the center of one straight section where the track is composed of two straight sections (on opposite sides) and two rotate sections. FIG. 12 also shows a leading position 1210 of a potential leading moving element and a trailing position 1215 of a potential trailing moving element. In FIG. 12, the velocity/speed 1220 of the moving element is, for a majority of the straight section, constant. The speed of a moving element on the star wheel is also constant because the dial is typically rotating at a constant speed. Further, the nominal speed on the straight section is generally equal to the nominal (tangential) speed on the star wheel but this is not a necessity for the moving element to transition between a straight section and the star wheel. In this example, the straight section has a variable speed and the sinusoidal portion is configured to provide a linear position profile Generally speaking, for the handoff from straight-to-rotate (illustrated in FIG. 11B) to the opposite handoff from rotate-to-straight (FIG. 11H), the moving element is only under the control/influence of the star wheel. From FIG. 11B to FIG. 11C and from FIG. 11G to FIG. 11H, the moving element is both under control/influence of the straight section and the star wheel. During this portion, the linear speed of the moving element is such that the moving element, as influenced by the straight section, needs to be controlled to match the linear speed of the rotary wheel/spoke. It was determined that the velocity profile needed to provide a match between the straight and curved sections (or vice versa) is sinusoidal. For example, the speed of the moving element on the variable speed straight track needs to be lower when entering a constant speed rotary wheel and then adjust speed in a sinusoidal pattern to match with the constant speed of the rotary wheel to allow engagement. Similarly, on exiting the rotary wheel, the speed of the moving element on the straight track needs to follow a sinusoidal curve (i.e. match with the speed of the rotary wheel, briefly slow down and then speed up) to allow for disengagement of the moving element from the rotary wheel. Similar consideration would apply if the straight section where at a constant speed and the rotary wheel had variable speed capability. Where both the straight section and the rotary wheel/curved section have variable speed, the velocity profile could be matched by contributions from either or both movement mechanisms.

Further, because of the need for the sinusoidal profile in the velocity profile, it was then determined that it is helpful for smooth motion to, during the approach and departure (FIG. 11A to FIG. 11B and FIG. 11H to FIG. 11I), adjust the velocity/motion profile of the moving element to change (e.g. slow down and speed back up) as a "speed match" so that, at the point of handoff (FIG. 11B and FIG. 11H), the speed and acceleration (acceleration in FIG. 13) match for each drive at the start of the sinusoidal velocity profile. As shown in FIG. 13, the speed match portion includes a deceleration and an acceleration leading to match the entry speed needed for the sinusoidal portion of the velocity profile.

As shown in FIG. 12, a method for controlling the moving element includes having the controller use a constant velocity/speed on the straight section and then adjust the moving element velocity profile during a speed match segment when the moving element is approaching the star wheel. The controller then uses a sinusoidal velocity profile during a sinusoidal segment where the star wheel is engaging the moving element. The moving element is then controlled at constant speed on the star wheel/dial. Next, the controller controls the velocity profile to provide a sinusoidal section where the star wheel is disengaging the moving element and then controls for a speed matching section when the moving element is moved onto a straight section. In this embodiment, the moving element then moves back to constant speed on the straight section. As illustrated, in this example, the position changes at a constant rate while the velocity varies to accommodate for the movement from linear motion to circular/curved motion as well as the change in drive. It will be understood that the velocity profile on the straight section or the curved section does not need to be constant but can be varied as needed for a particular application.

Figure 11A:
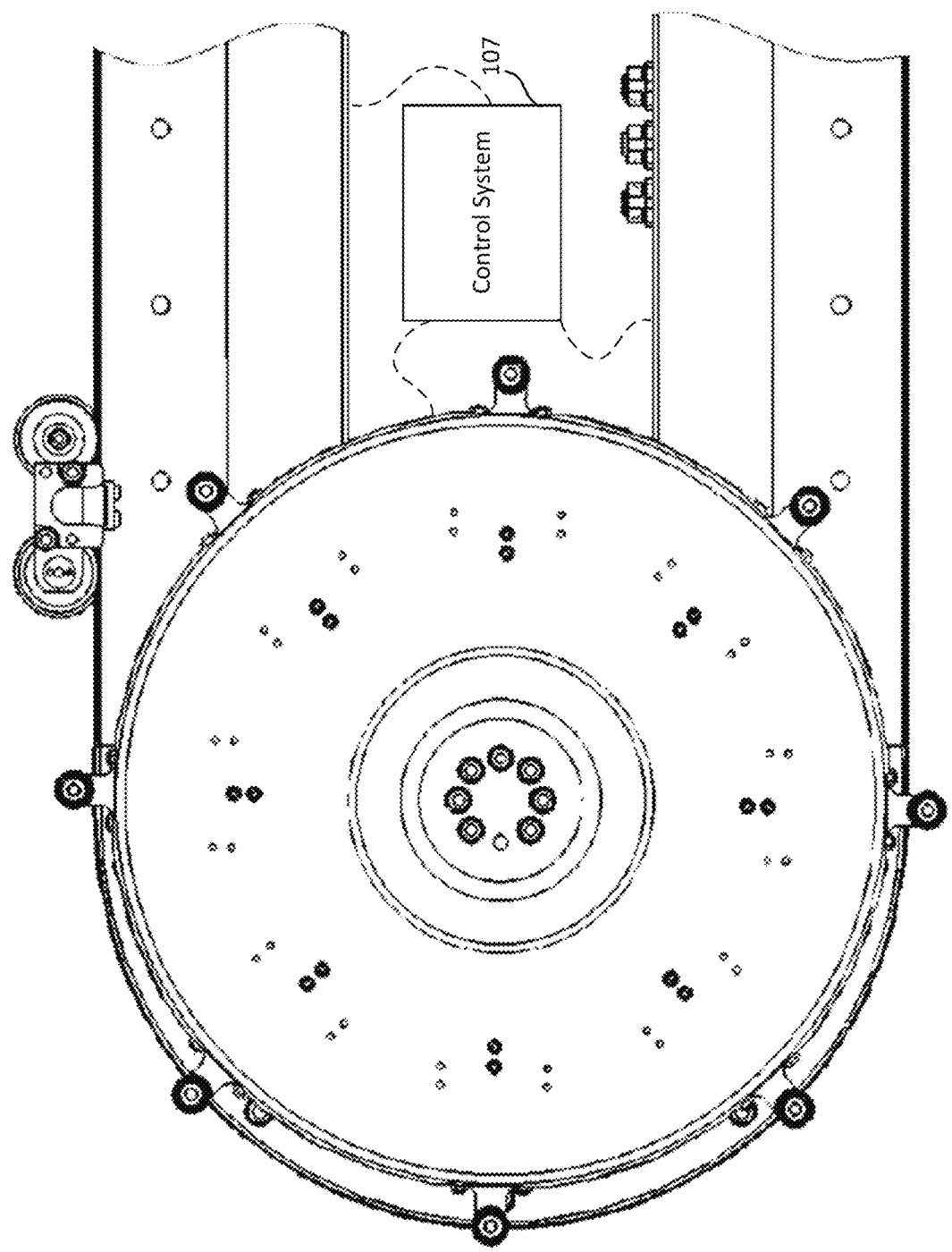
Figure 11B:
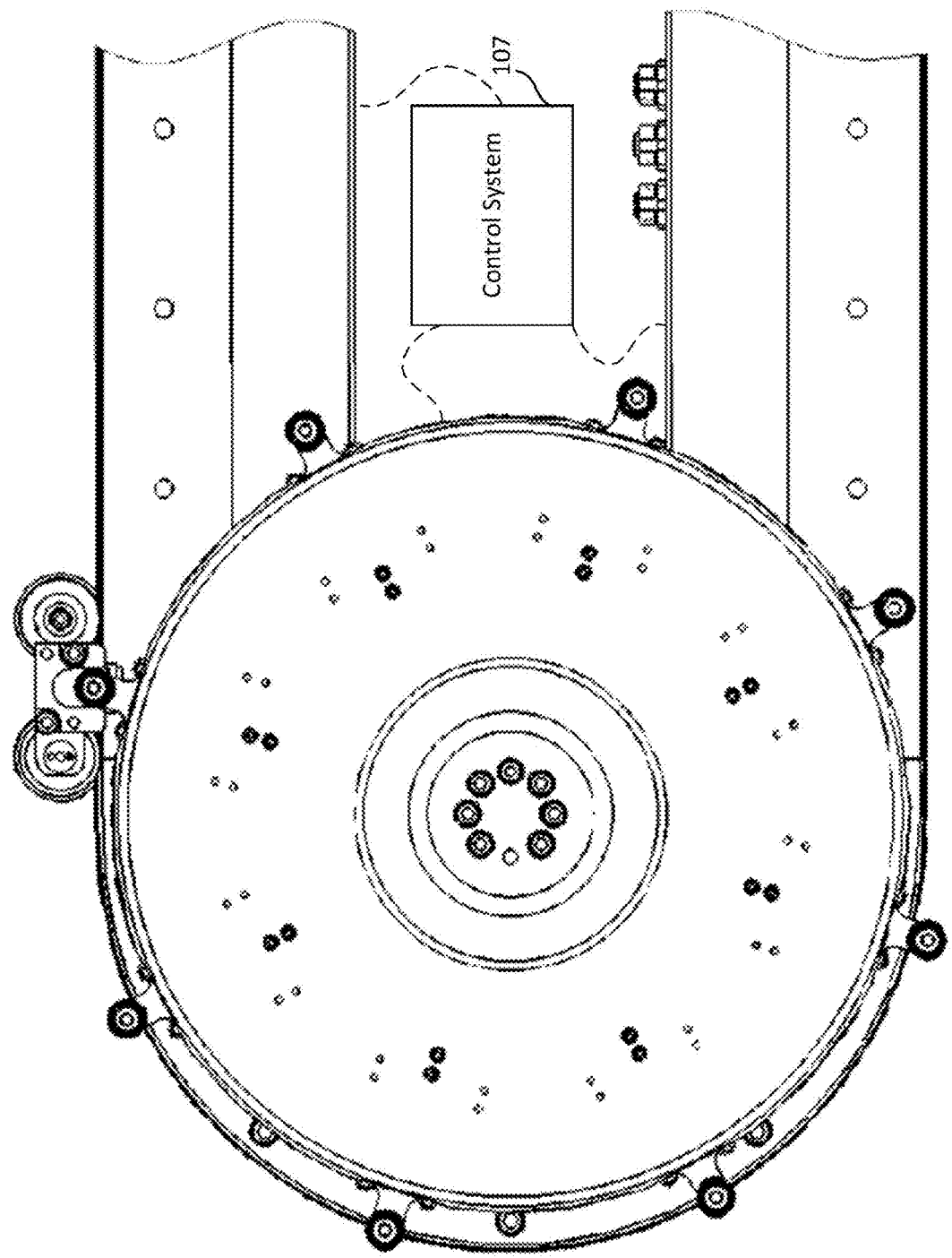
Figure 11C:
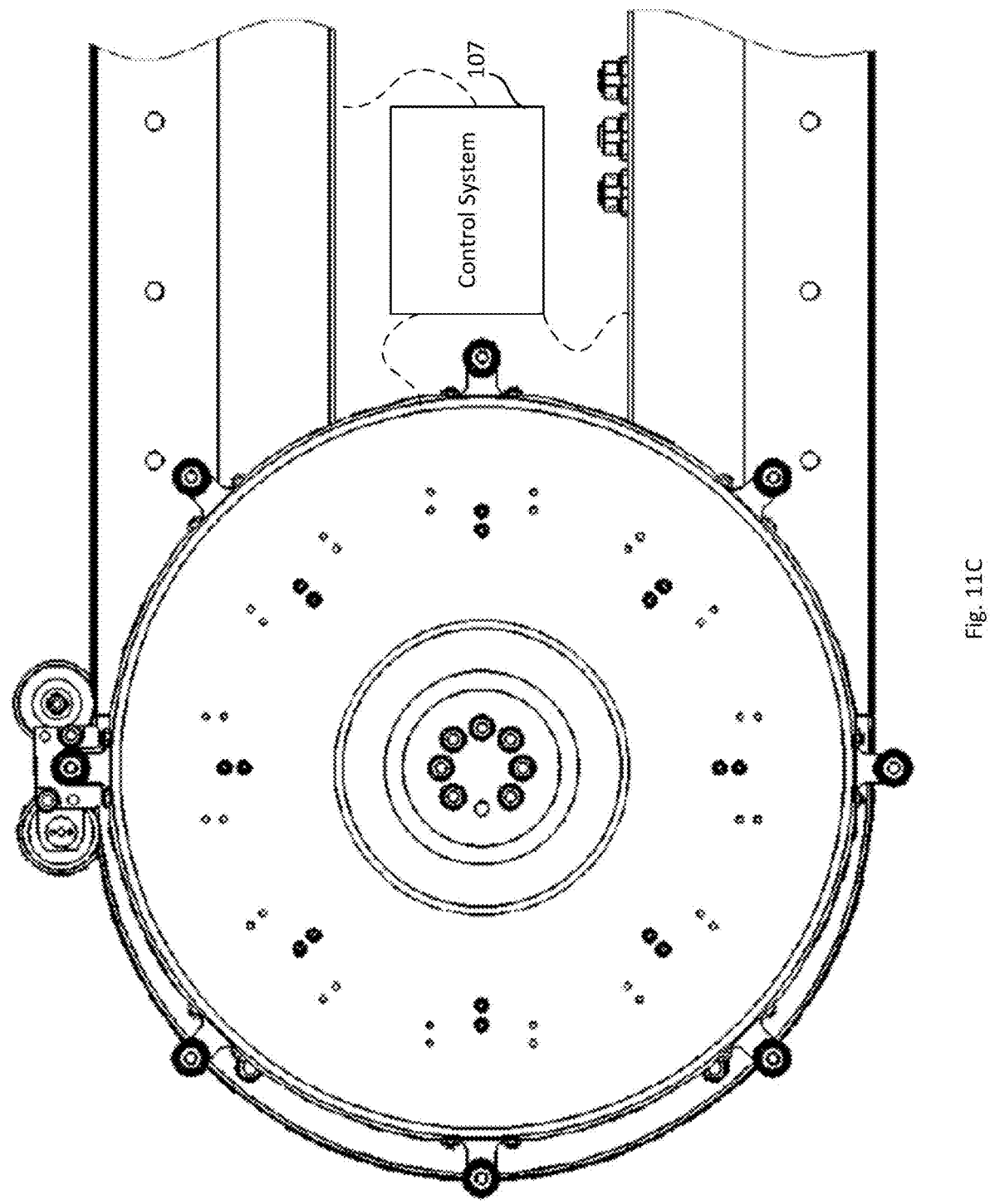
Figure 11D:
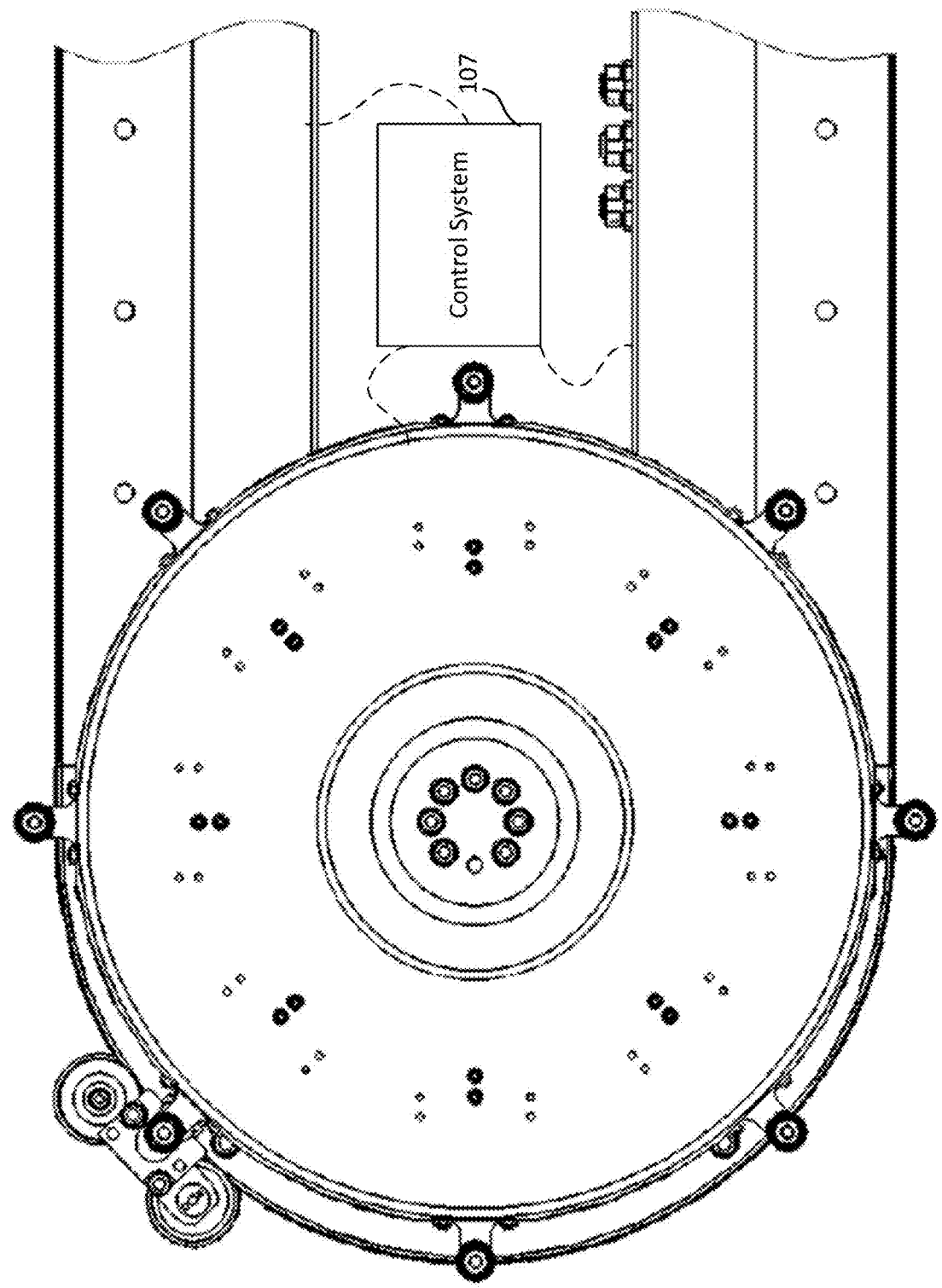
Figure 11E:
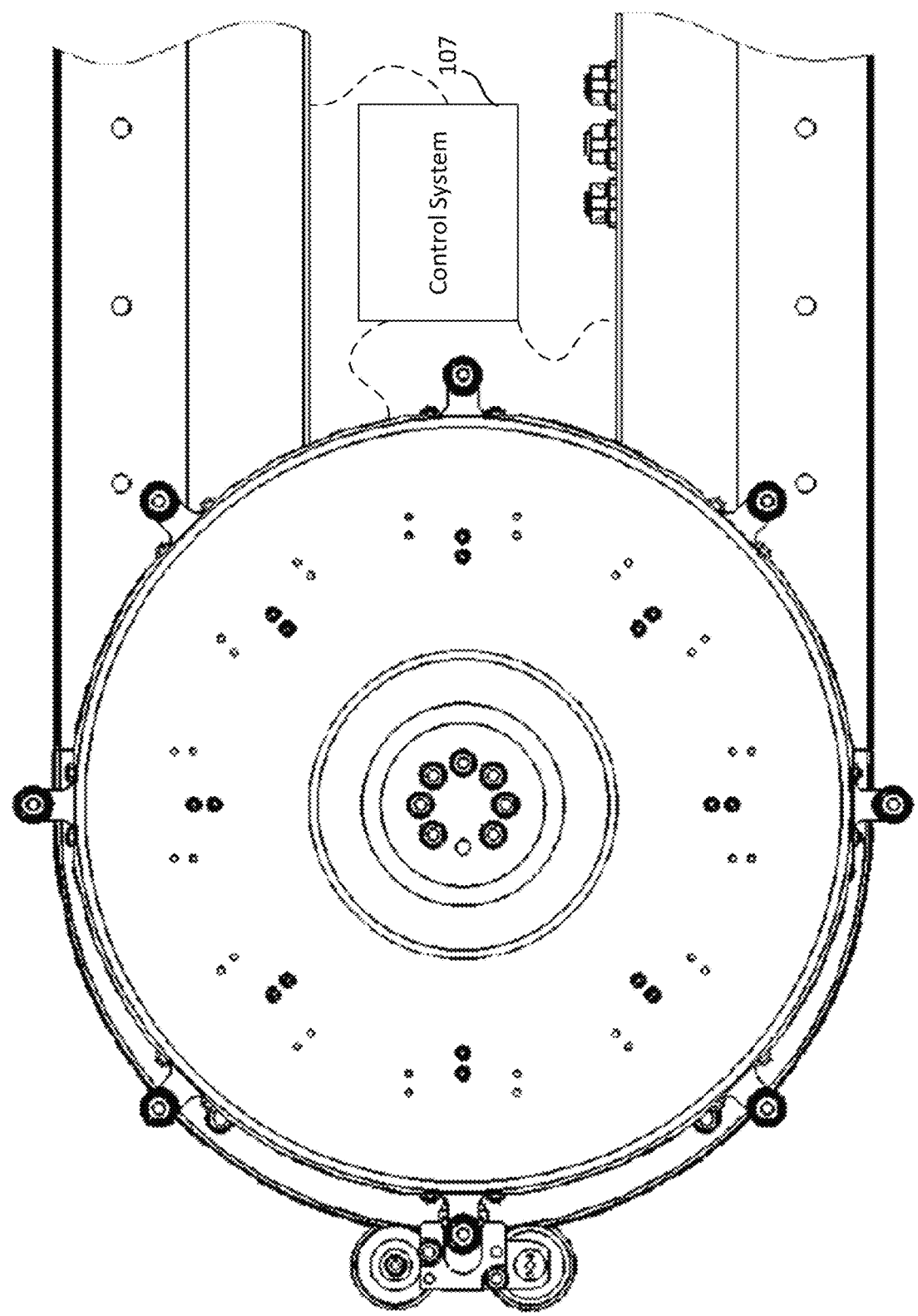
Figure 11F:
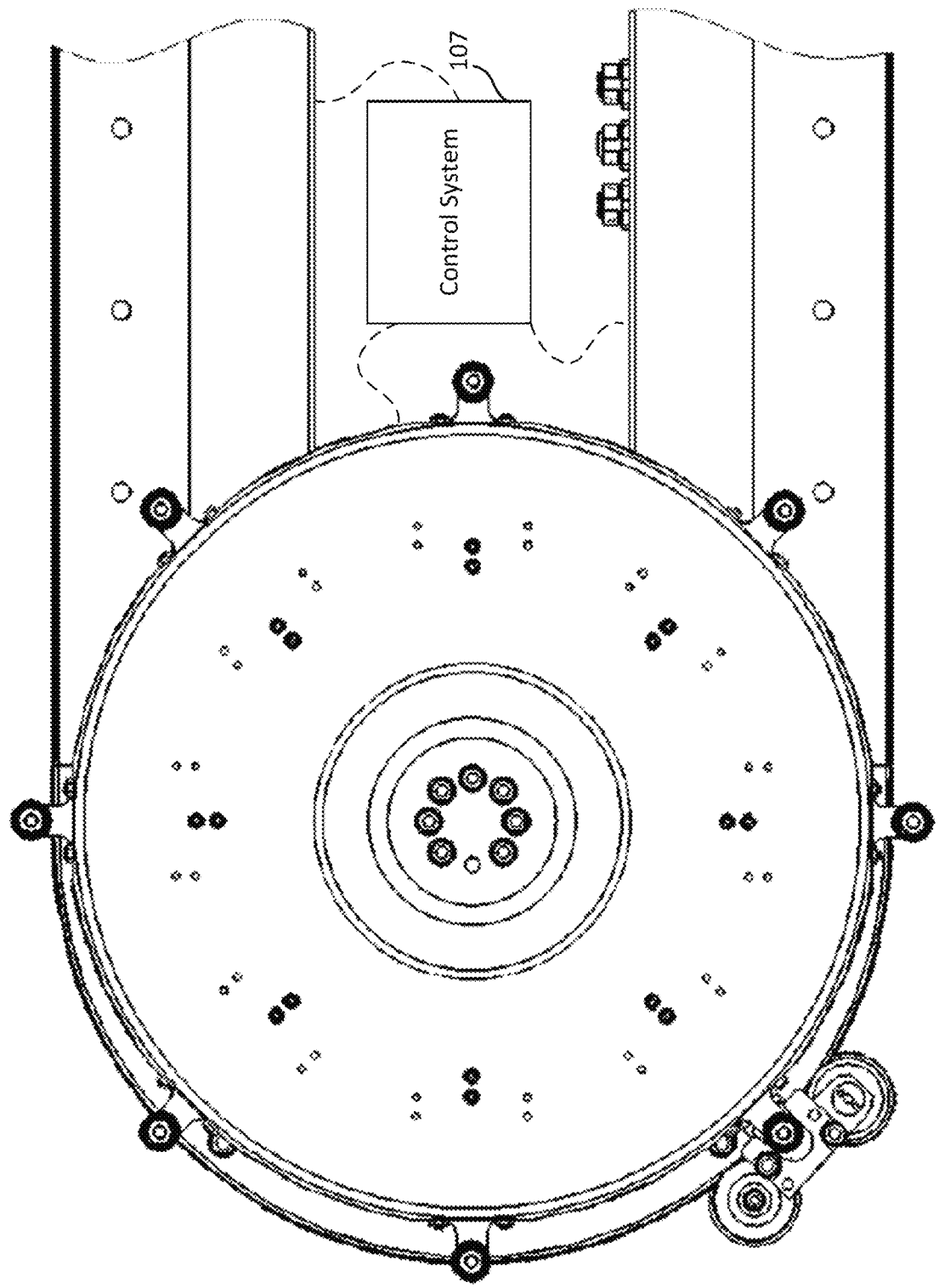
Figure 11G:
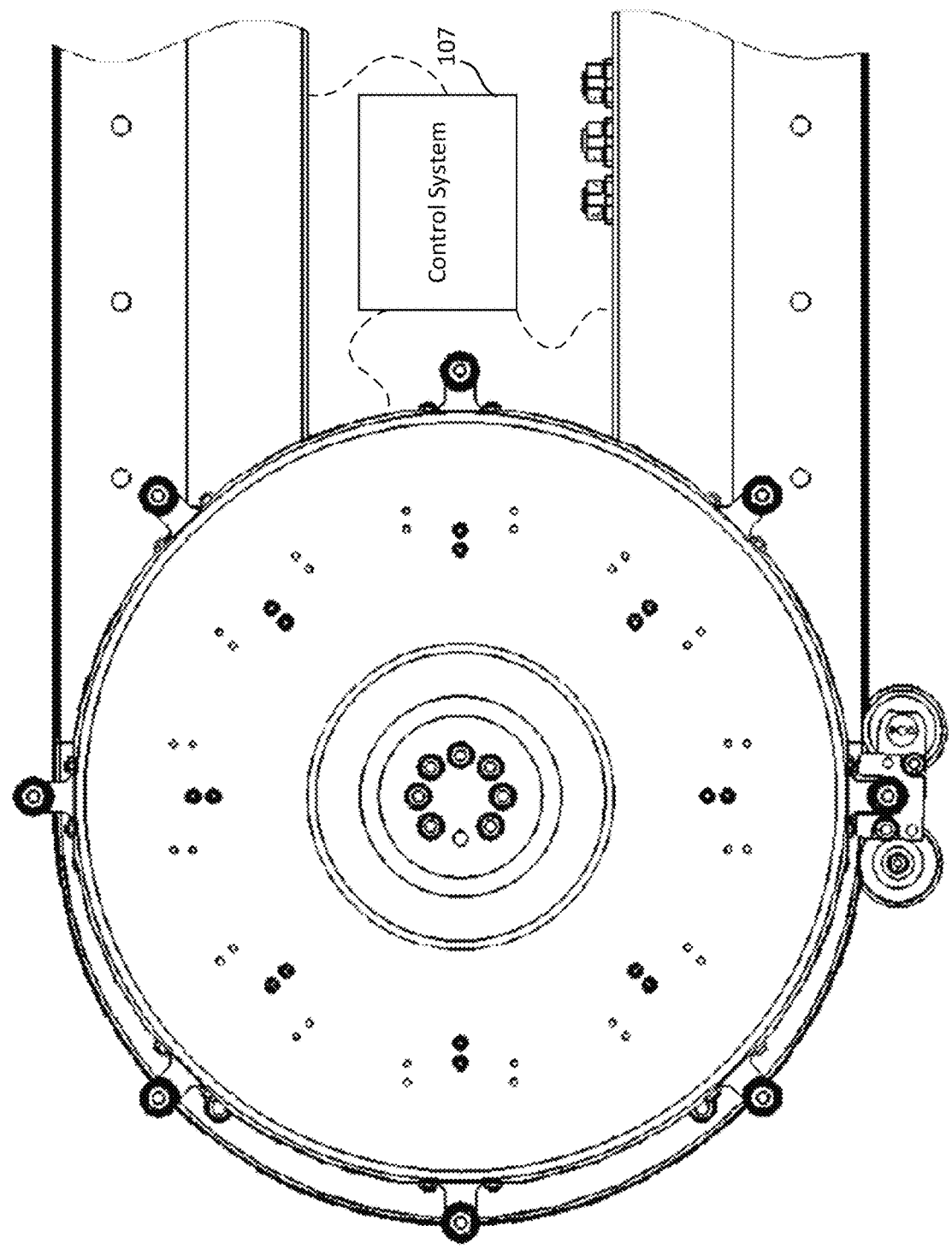
Figure 111:
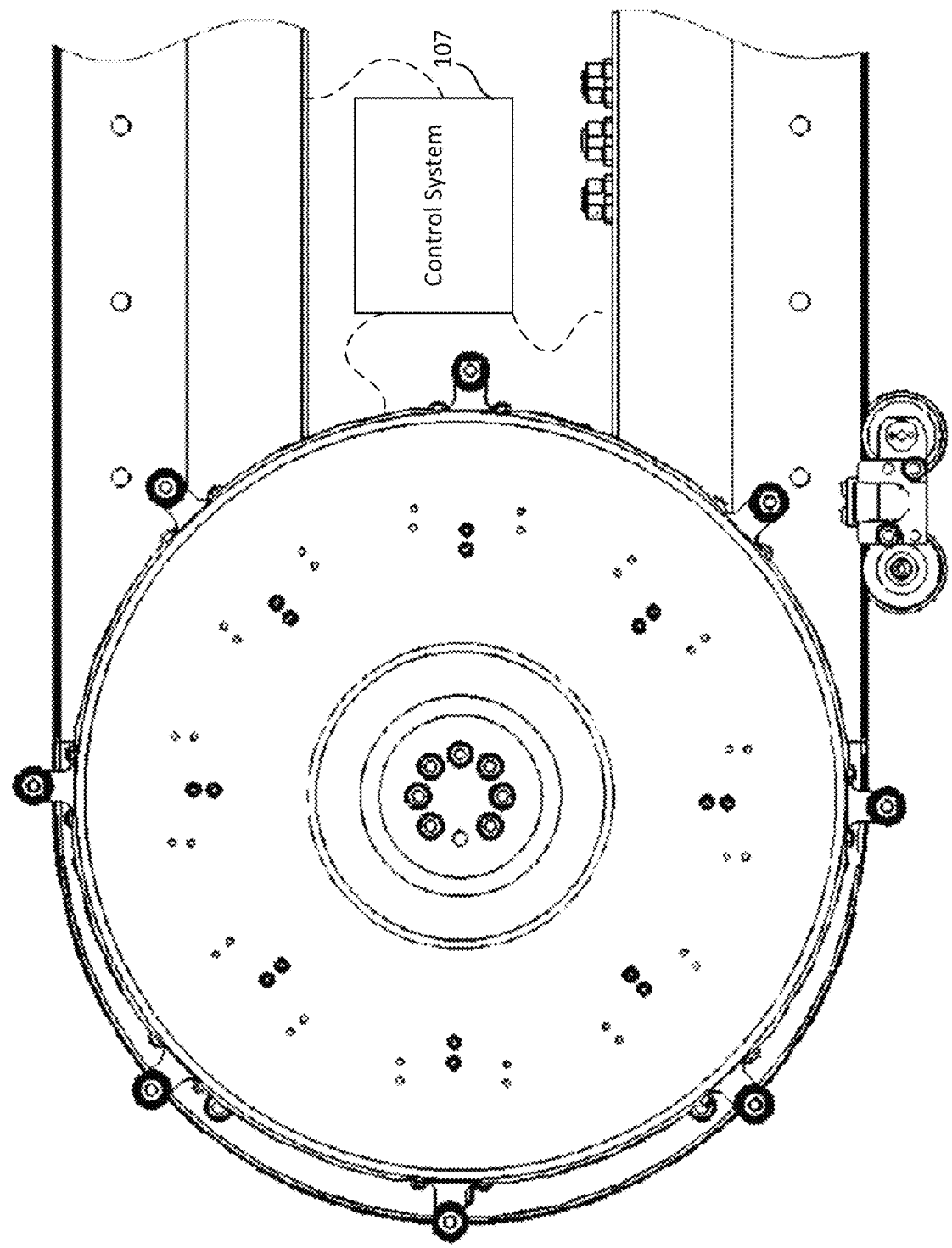
Figure 12:
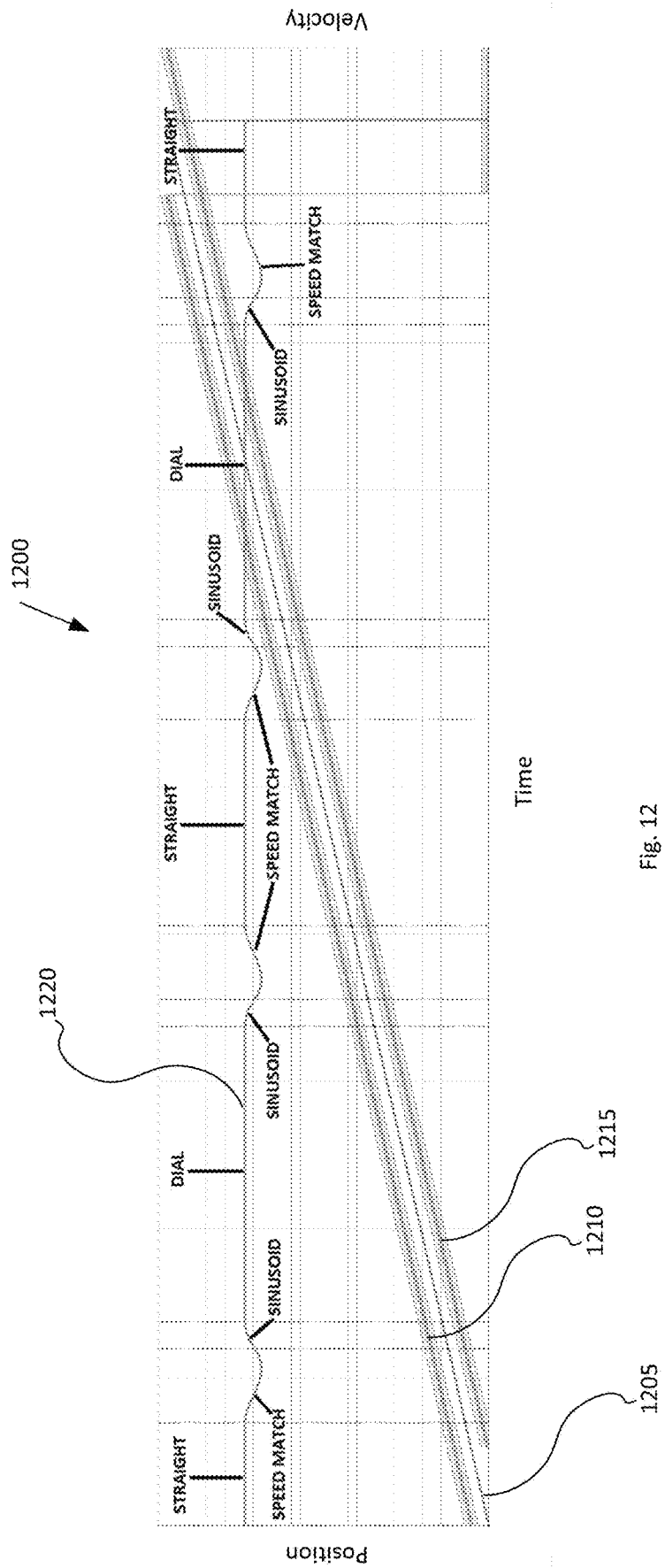
FIG. 12 illustrates position/velocity vs. time for the moving element as it moves through the motion shown by FIGS. 11A to 11I.

As can be seen in FIGS. 11A to 11I, the star wheel/dial radius does not necessarily have to match the radius of the curved track section. In the example of FIG. 11A, it can be seen that the spokes of the star wheel/dial can remain engaged with the moving element at different depths into the engagement mechanism on the moving element. This allows the curved track section to have a varying radius of curvature to allow for smoother motion of the moving element. For example, the profile of the curved track section can be arranged to reduce or avoid jerk or the like as the moving element moves around the curve. In this embodiment, the wheel remains circular but this is not always required.

Interestingly, in some embodiments, in a situation where the moving element does not engage correctly with the spoke as intended, the spoke or a following spoke (or following moving element) may continue to move the moving element around the curved track section such that the moving element can be "recovered" when it is moved from the curved track section back to a straight track section.

Embodiments of the system are intended to allow for a smaller size of curved track section as the rotary drive and star wheel can generally fit in a smaller area than what would conventionally be required for a magnetic motor drive in a curved track section or for alternate types of drives/curves. Further, the spokes of the star wheel can be configured such that they do not extend beyond the outside of the moving elements such that additional space is not needed to control/move the moving elements around the curved track section. Having the spokes at the bottom of the curved track section is intended to also reduce risk of the spokes interfering with other operations, operators or the like.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. Further, it will be understood that various elements/aspects of each embodiment described herein may be used with other embodiments as appropriate and that each embodiment may include a sub-set of the elements/aspects described therewith.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor/controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Applicants reserve the right to pursue any embodiments or sub-embodiments or combinations thereof disclosed in this application; to claim any part, portion, element and/or combination thereof, including the right to disclaim any part, portion, element and/or combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A conveyor system comprising:
   at least one moving element;
   a track comprising:
     at least one straight track section comprising a first mechanism for moving the at least one moving element; and
     at least one curved track section connected to the straight track section comprising a second mechanism for moving the at least one moving element; and
   a controller configured to control a speed of the at least one moving element as the at least one moving element moves from the at least one straight track section to the at least one curved track section and from the at least one curved track section to the at least one straight track section such that a velocity profile of the moving element includes a sinusoidal portion and a speed match portion, while the moving element is maintained with a linear position profile.

2. A system according to claim 1, wherein the speed match portion is in association with the sinusoidal portion.

3. A system according to claim 2, wherein the speed match portion includes a deceleration and an acceleration configured to provide a smooth entry or exit from the sinusoidal portion.

4. A system according to claim 3, wherein, for entry to the sinusoidal portion, the deceleration comprises a reduction in speed below the entry speed of the sinusoidal portion and the acceleration comprises an increase in speed to equal the entry speed to the sinusoidal portion.

5. A system according to claim 1, wherein the first mechanism comprises an electromagnetic drive and the controller is configured to control the electromagnetic drive to control the speed of the at least one moving element according to the velocity profile to match a constant speed of the second mechanism.

6. A system according to claim 1, wherein the second mechanism comprises a rotary wheel provided to the curved track section wherein the rotary wheel comprises an engagement mechanism configured to engage with the at least one moving element and move the at least one moving element around the curved track section.

7. A system according to claim 6, wherein the engagement mechanism comprises at least one spoke comprising a spoke engagement mechanism configured to engage with the at least one moving element.

8. A system according to claim 7, wherein the at least one spoke comprises a bias portion, wherein the bias portion is configured to assist the engagement mechanism to engage with the at least one moving element.

9. A method for transitioning between a straight track section and a curved track section of a conveyor, the method comprising:
   moving a moving element on the straight track section toward the curved track section or from the curved track section toward the straight track section; and
   controlling a speed of the moving element as it transitions from the straight track section to the curved track section or from the curved track section to the straight track section such that a velocity profile of the moving element comprises a sinusoidal portion and a speed match portion, while the moving element is maintained with a linear position profile.

10. A method according to claim 9, wherein the speed match portion is in association with the sinusoidal portion.

11. A method according to claim 10, wherein the speed match portion includes a deceleration and an acceleration configured to provide a smooth entry or exit from the sinusoidal portion.

12. A method according to claim 11, wherein, for entry to the sinusoidal portion, the deceleration comprises a reduction in speed below the entry speed of the sinusoidal portion and the acceleration comprises an increase in speed to equal the entry speed to the sinusoidal portion.

13. A method according to claim 11, wherein, for exit from the sinusoidal portion, the deceleration comprises a reduction in speed below the exit speed of the sinusoidal portion and the acceleration comprises an increase in speed to equal the required speed of the track.

* * * * *